(12) United States Patent
Huebel et al.

(10) Patent No.: US 11,425,346 B2
(45) Date of Patent: Aug. 23, 2022

(54) DEVICE AND METHOD FOR PROVIDING A MULTI-COLOURED LIGHT BEAM FOR A PROJECTOR, PROJECTOR AND METHOD OF PRODUCTION

(71) Applicant: Robert Bosch GmbH, Stuttgart (DE)

(72) Inventors: Alexander Huebel, Leonberg (DE); Tobias Graf, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/285,282

(22) PCT Filed: Oct. 4, 2019

(86) PCT No.: PCT/EP2019/076864
§ 371 (c)(1),
(2) Date: Apr. 14, 2021

(87) PCT Pub. No.: WO2020/078735
PCT Pub. Date: Apr. 23, 2020

(65) Prior Publication Data
US 2021/0392308 A1 Dec. 16, 2021

(30) Foreign Application Priority Data
Oct. 17, 2018 (DE) ...................... 10 2018 217 745.7

(51) Int. Cl.
*H04N 9/31* (2006.01)

(52) U.S. Cl.
CPC ......... *H04N 9/3152* (2013.01); *H04N 9/3158* (2013.01); *H04N 9/3164* (2013.01)

(58) Field of Classification Search
CPC ...... H04N 9/3152; H04N 9/3158; H04N 9/31; H04N 9/3164; H04N 9/3161; G02B 6/00; G02B 27/104
(Continued)

(56) References Cited

U.S. PATENT DOCUMENTS 5,802,222 A 9/1998 Rasch et al.
2011/0188000 A1* 8/2011 Kuriki .................. G02B 6/3506
353/31
(Continued)

FOREIGN PATENT DOCUMENTS

DE 601 22 267 T2 4/2008
JP 2010-276959 A 12/2010

OTHER PUBLICATIONS

International Search Report corresponding to PCT Application No. PCT/EP2019/076864, dated Dec. 19, 2019, (German and English Language Document) (6 pages).
(Continued)

*Primary Examiner* — Sherrie Hsia
(74) *Attorney, Agent, or Firm* — Maginot, Moore & Beck LLP

(57) ABSTRACT

The disclosure relates to a device for providing a multi-colored light beam for a projector. The device comprises a first light source, a second light source, a waveguide element, a beam forming device and a structure element. The waveguide element forms a first waveguide for guiding light from the first light source, a second waveguide for guiding light from the second light source and a coupling out region for coupling light out of the first waveguide and the second waveguide. The beam forming device is designed to form the multi-colored light beam using the light coupled out of the coupling out region. The first light source, the second light source, the waveguide element and the beam forming device are arranged on the structure element.

11 Claims, 18 Drawing Sheets

(58) Field of Classification Search
USPC ...... 348/744, 760, 757, 780; 353/30, 31, 94; 385/15
See application file for complete search history.

(56) References Cited

U.S. PATENT DOCUMENTS

2012/0044459 A1* 2/2012 Klein .................. H04N 13/363
353/8
2017/0146744 A1 5/2017 Katsuyama et al.

OTHER PUBLICATIONS

Nakao, A. et al., "Integrated waveguide-type red-green-blue beam combiners for compact projection-type displays," Optic Communications, 2014, vol. 330, pp. 45-48, Elsevier (4 pages).

* cited by examiner

DEVICE AND METHOD FOR PROVIDING A MULTI-COLOURED LIGHT BEAM FOR A PROJECTOR, PROJECTOR AND METHOD OF PRODUCTION

This application is a 35 U.S.C. § 371 National Stage Application of PCT/EP2019/076864, filed on Oct. 4, 2019, which claims the benefit of priority to Serial No. DE 10 2018 217 745.7, filed on Oct. 17, 2018 in Germany, the disclosures of which are incorporated herein by reference in their entirety.

BACKGROUND

It is possible to use miniaturized projection systems for example for smartglasses or wearable devices. Glass fibers may be used to combine different-colored light beams to form a light beam.

DE 601 22 267 T2 discloses an optical combiner in connection with a photonic component, such as may be used in optical and optoelectronic data processing. The optical combiner constitutes a waveguide structure, which is formed in a silicate glass body. Light of different wavelengths is combined in the combiner.

SUMMARY

Against this background, with the approach proposed here, a device and a method for providing a multicolored light beam for a projector, a projector and a production method for producing a device for providing a multicolored light beam for a projector according to the main claims are proposed. Advantageous refinements and improvements of the device specified in the independent claim are possible through the measures referred to in the dependent claims. With this approach, it is advantageously possible to form a multicolored light beam from a plurality of different-colored light beams. By using a waveguide element having one optical waveguide per light source formed in the waveguide element, it is possible to provide a multicolored light beam modulable at high frequency with a high beam quality. This is advantageously achievable in a compact design and therefore makes it possible to use the device proposed here in conjunction with a so-called picoprojector, a miniaturized projection system which may for example be used for smartglasses, an electronic wristwatch (smartwatch) or a cell phone (smartphone).

A device for providing a multicolored light beam for a projector is proposed. The device comprises at least a first light source and a second light source. The device furthermore comprises a waveguide element, a beamforming device and a structural element. The waveguide element forms a first waveguide for guiding light of the first light source, a second waveguide for guiding light of the second light source, and an output region for outputting light from the first waveguide and the second waveguide. The beamforming device is configured to form the multicolored light beam by using the light output from the output region. The first light source, the second light source, the waveguide element and the beamforming device are arranged on the structural element.

The projector may for example be a high-resolution miniaturized projection system, a so-called minibeamer or picoprojector for a wearable device such as smartglasses. The device may be referred to as a multicolored light source module for the projector, and may be configured with two, three or more light sources, for example as a red-green-blue light source module. The first light source and the second light source may for example be produced as edge-emitting laser diodes (for example as DFB and DBR lasers), as edge-emitting superluminescent LEDs or as vertically emitting laser diodes (so-called VCSELs), or as a combination of different light source types based on different semiconductor technologies. In order to produce the first light source and the second light source, it is for example possible to use commercially available chips having one of the light source forms mentioned, which have external dimensions of about 500 micrometers×500 micrometers×100 micrometers (length×width×height). The waveguide element may consist of a cladding material having a lower refractive index than a core material, the first waveguide and the second waveguide being formed in the core material. For example, silicon dioxide may be used as the cladding material for the waveguide element, with silicon nitride, silicon oxynitride or lithium niobate as the core material. As an alternative, a polymer or a hybrid polymer may also be used as cladding material. The core material may be embedded in the cladding material in order to form the waveguide. The waveguide element may therefore be an element which comprises regions that consist of the cladding material and comprises regions that consist of the core material. In this case, the waveguide element may be configured integrally. The waveguides may be waveguides formed in the waveguide element by a lithographic exposure method. The output region may be produced as part of the waveguide element. The beamforming device may, for example, comprise one or more microlenses. The structural element may be formed as a mechanical structural part on which all other component parts of the device may be fastened, for example by means of a soldering process or by means of eutectic bonding.

According to one embodiment, the first waveguide and the second waveguide may be configured as single-mode waveguides. Furthermore, ends, formed in the output region, of the first waveguide and of the second waveguide may be arranged at a different distance from the beamforming device. The single-mode nature of the first and second waveguides is advantageous since a distribution of light emitted at the waveguide end is not dependent on the properties of the light source. Manufacturing tolerances of the light source therefore do not affect the emitted light distribution, which is advantageous for use of the device in connection with a miniaturized projector since in this case the various beams have the same beam parameters (origin, direction, diameter and divergence angle), which advantageously makes it possible to use a common optical element, for example a beamforming device, for the outputted light of the waveguides in order to form the multicolored light beam. The different distance of the ends of the first waveguide and of the second waveguide is advantageous in relation to an adjustment tolerance of the beamforming device. By virtue of a defined separation of the relative positions of the ends of the waveguides, the adjustment between the beamforming device and the waveguides may advantageously be carried out with the aid of an adjustment of the degree of freedom between the beamforming device and the waveguide element, adjustment between the beamforming device and the individual waveguides not being necessary in this case, which advantageously saves costs.

The first waveguide, and in addition or as an alternative the second waveguide, may according to one embodiment be formed as a strip waveguide, as a rib waveguide or as a cylindrical waveguide. The profile of the waveguides may in this case advantageously correspond to a configuration of a material of the waveguide element and of a material of the waveguide formed in the waveguide element in order to achieve a single-mode nature of the waveguides. Furthermore, a cross-sectional shape of the waveguides may therefore be selected according to a color of the light source of the light to be guided by the waveguide. In connection with the particular positioning of the ends of the waveguides as described above, a beam divergence of the multicolored light beam to be formed may thereby advantageously be adjusted equally for all colors.

The waveguide element may, according to one embodiment, be configured as an optical chip. In this case, the waveguide element may, for example, be produced as a photonic integrated circuit. The use of an optical chip as the waveguide element advantageously allows a compact design of the device.

Furthermore, the waveguide element may, according to one embodiment, form a first input element for inputting light from the first light source into the first waveguide. In addition or as an alternative, the waveguide element may form a second input element for inputting light from the light source into the second waveguide. The input element may be formed as part of the waveguide element, and in addition or as an alternative be arranged between the light source and the waveguide element. The input element may for example be formed by particular shaping of a start of the waveguide, for example by a funnel shape, or by embedding an element such as a grating coupler. By using the input element, a position tolerance of the light sources with respect to the waveguide element of several micrometers may advantageously be achieved, so that mounting of the waveguide element may be carried out by means of an automatic fitting machine. In the case of a weak light source, it may furthermore be advantageous to design the input element for a particularly high efficiency. In the case of a strong light source, it may be advantageous to design the input element in such a way that a part of the light power is reflected or absorbed, in order to increase safety of the device in relation to eye-safe operation of a projector having such a light source.

The beamforming device may, according to one embodiment, comprise at least one microlens and one correction plate for correcting a focal point of the microlens. The correction plate may, for example, be a further microlens having a low refractive power. In order to correct the focal point, a microlens may for example be integrated in the device and, after measuring the beam divergence of the multicolored light beam formed, a correspondingly correcting correction plate may be used in order to correct the beam divergence. This is advantageously economical. The beamforming device may also comprise a multiplicity of microlenses, in which case the focal point of the beamforming device may be corrected by means of the correction plate.

The device may, according to one embodiment, also comprise a drive electronics element. The drive electronics element may be arranged on the structural element. Furthermore, the drive electronics element may be connected to the first light source and the second light source so as to be capable of transmitting signals. The drive electronics element may be produced as an integrated circuit, for example as an application-specific integrated circuit. The drive electronics element may consist of a plurality of parts, for example a digital logic unit and a digital/analog converter. For a fast signal rise time, it is advantageous to form short electrical connections between the drive electronics element and the light sources. For this purpose, the light sources may for example be soldered on the drive electronics element in the form of an application-specific integrated circuit. Advantageously, a signal transmission speed may thus be increased.

The device may also, according to one embodiment, comprise a third light source. The waveguide element may in this case form a third waveguide for guiding light from the third light source, and the output region may additionally be formed to output light from the third waveguide. Embodiments of the third light source and of the third waveguide may be configured according to the above-described embodiments of the first and second light sources and of the first and second waveguides. Advantageously, the device having the third light source may be configured as a red-green-blue light source module for the projector. The device may also comprise a multiplicity of light sources, for which a further waveguide may respectively be formed in the waveguide element.

The device may, according to one embodiment, be smaller than 8 millimeters. In this case, a length, height or width of the device may be less than 8 millimeters, or the device may have a size of less than 8 cubic millimeters. The device may, for example, be produced for an installation space of 5 millimeters×5 millimeters×5 millimeters. Each of the waveguides may therefore have, for example, a length of less than 8 millimeters. A compact design of the device is therefore advantageously possible for use for a high-resolution miniaturized projector. This is advantageous in comparison with combining different-colored light sources to form a beam by means of semitransparent mirrors, since such an embodiment has a size of several centimeters.

With this approach, a projector having at least one aforementioned device is furthermore proposed. The projector may be produced as a miniaturized projector, for example as a so-called high-resolution picoprojector, and may for example be used for smartglasses or a wearable device. The at least one device may be used as a light source of the projector. For use in connection with smartglasses which function according to a principle of retinal projection, it is furthermore advantageous that the beam parameters of the light beam formed by means of the device may correspond precisely to a target value. The projector may comprise at least one deflecting element, for example an adjustable micromirror. The deflecting element may be used for controlled deflection of the light beam provided by the at least one device. In this way, the pixels of an image may be projected in chronological succession onto a projection surface by using a single device. As an alternative, the projector may comprise a multiplicity of devices. This has the advantage that a multiplicity of pixels of the image may be projected chronologically in parallel onto the projection surface.

A method for providing a multicolored light beam for a projector is also proposed. The method comprises an emission step, a guiding step and a forming step. In the emission step, light is emitted by using a first light source and a second light source. In the guiding step, light of the first light source is guided by using a first waveguide. In the guiding step, light of the second light source is furthermore guided by using a second waveguide. In the guiding step, light is also output from the first waveguide and the second waveguide by using an output region. The first waveguide, the second waveguide and the output region are formed from a waveguide element. In the forming step, the multicolored light beam is formed by means of a beamforming device by using the light output from the output region.

Furthermore, with this approach, a production method for producing a device for providing a multicolored light beam for a projector is provided. The production method comprises a step of providing a first light source and a second light source, a step of providing a waveguide element, a step of providing a beamforming device and an arrangement step. In the step of providing the waveguide element, the waveguide element which forms a first waveguide for guiding light of the first light source, a second waveguide for guiding light of the second light source, and an output region for outputting light from the first waveguide and the second waveguide, is provided. In the step of providing the beamforming device, the beamforming device which is configured to form the multicolored light beam by using the light output from the output region is provided. In the arrangement step, the first light source, the second light source, the waveguide element and the beamforming device are arranged on a structural element in order to produce the device. For this purpose, said component parts may, for example, be soldered or fastened by means of eutectic bonding onto the structural element.

BRIEF DESCRIPTION OF THE DRAWINGS

Exemplary embodiments of the approach presented here are represented in the drawings and explained in more detail in the description below, in which.

DETAILED DESCRIPTION

In following description of favorable exemplary embodiments of the present disclosure, identical or similar references are used for the elements represented in the various figures which have a similar effect, repeated description of these elements being omitted.

In following description of favorable exemplary embodiments of the present invention, identical or similar references are used for the elements represented in the various figures which have a similar effect, repeated description of these elements being omitted.

Figure 1:
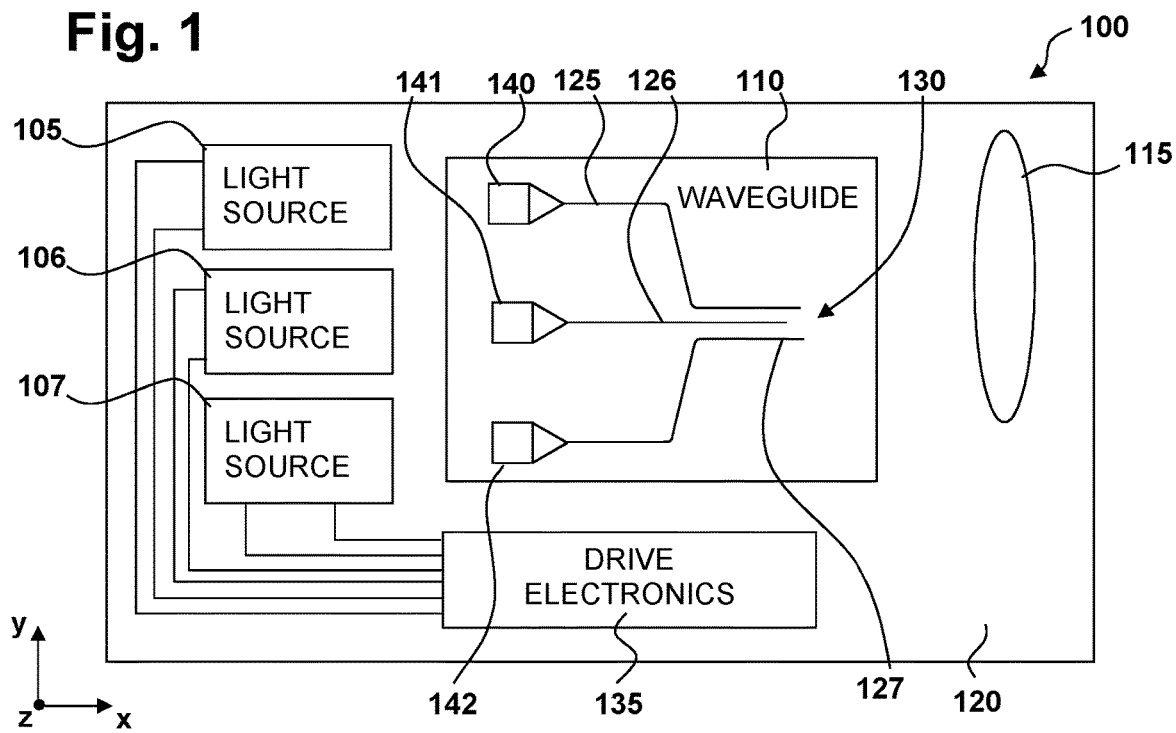
FIGS. 1 and 2 show a schematic representation of a device for providing a multicolored light beam for a projector according to one exemplary embodiment.

FIG. 1 shows a schematic representation of a device 100 for providing a multicolored light beam for a projector according to one exemplary embodiment. An overview representation of the device 100 is shown. The device 100 comprises a first light source 105, a second light source 106, and according to this exemplary embodiment furthermore a third light source 107. The device 100 furthermore comprises a waveguide element 110, a beamforming device 115 and a structural element 120. The waveguide element 110 forms a first waveguide 125 for guiding light of the first light source 105, a second waveguide 126 for guiding light of the second light source 106, a third waveguide 127 for guiding light of the third light source 107, and an output region 130 for outputting light from the first waveguide 125, the second waveguide 126 and the third waveguide 127. The beamforming device 115 is configured to form the multicolored light beam by using the light outputted from the output region 130. The first light source 105, the second light source 106, the third light source 107, the waveguide element 110 and the beamforming device 115 are arranged on the structural element 120.

The orthogonal coordinate system shown illustrates by way of example the schematic arrangement shown here of said component parts on the structural element 120. The waveguide element 110 is arranged between the waveguides 125, 126, 127 and the beamforming device 115 in relation to the x axis. The light emitted by the light sources 105, 106, 107 is guided by the waveguides 125, 126, 127 in the direction of the x axis to the beamforming device 115. In this case, the waveguides 125, 127 respectively comprise a curved section by which the spacing of the waveguides 125, 126, 127 is reduced. The light sources 105, 106, 107 are arranged next to one another in the direction of the y axis. The z axis as a height axis shows, for example, a height of component parts of the device 100, which is shown in more detail with the aid of the subsequent figures.

According to the exemplary embodiment shown here, the device 100 also comprises an optional drive electronics element 135. The drive electronics element 135 is arranged on the structural element 120 and is connected to the first light source 105, the second light source 106 and the third light source 107 so as to be capable of transmitting signals. The drive electronics element 135 is configured to drive the light sources 105, 106, 107, i.e. for example to switch them on or off and optionally to adjust a light intensity of the light emitted by the light sources 105, 106, 107.

The drive electronics element 135 for the light sources 105, 106, 107 may for example be produced as an integrated circuit, for example as an application-specific integrated circuit (ASIC) element. Furthermore, the drive electronics element 135 may be configured integrally or in several parts, and it may for example comprise a digital logic unit and a digital/analog converter. Depending on the resolution of the projector in which the device 100 is used, fast drive electronics are required since pixel rates may be more than 100 MHz to a few GHz. It is therefore advantageous to make the electrical connections between the drive electronics element 135 and the light sources 105, 106, 107 short for fast signal rise times. For this purpose, the light sources 105, 106, 107 may for example be soldered directly onto an application-specific integrated circuit element as the drive electronics element 135.

Furthermore, according to the exemplary embodiment shown here, the waveguide element 110 forms a first input element 140 for inputting light from the first light source 105 into the first waveguide 125. In addition, the waveguide element 110 forms a second input element 141 for inputting light from the second light source 106 into the second waveguide 126 and a third input element 142 for inputting light from the third light source 107 into the third waveguide 127. The use of input elements 140, 141, 142 is advantageous in order to input the light with a well-defined efficiency from the light sources 105, 106, 107 into the waveguides 125, 126, 127.

Edge-emitting laser diodes (for example DFB and DBR lasers), edge-emitting superluminescent LEDs or vertically emitting laser diodes (so-called VCSELs), may be used as the light sources 105, 106, 107. A combination of different light source types may also be used, for example in order to combine different wavelengths, which are usually based on different semiconductor technologies, with one another. The light sources 105, 106, 107 are, for example, available as chips with external dimensions of about 500 micrometers× 500 micrometers×100 micrometers (length×width×height). The device 100 comprises two or more light sources 105, 106, 107.

The structural element 120 may be configured as a mechanical structural part, and furthermore fulfills the function of a heat sink for the thermal power loss of the light sources 105, 106, 107 and of the drive electronics element 135. The component parts of the device 100 which are to be arranged on the structural element 120 are fastened on the structural element 120 by means of a stable fastening method, for example soldering processes and eutectic bonding. For example, the structural part is produced as a circuit board.

The beamforming device 115 is produced, according to one exemplary embodiment, as a microlens or a combination of microlenses. The beamforming device 115 is configured to generate a particular beam diameter and a particular beam divergence, depending on the use of the device 100 for the projector. In the case of a miniaturized projection system, the required beam divergence is often very small, i.e. a parallel or almost parallel beam is desired.

The device 110 may be used to integrate different-colored semiconductor light sources, the light sources 105, 106, 107, with drive electronics, the drive electronics element 135, and with micro-optical components such as the waveguide element 110, the waveguides 125, 126, 127 and the beamforming device 115 in a compact installation space, in such a way that a multicolored light beam which is modulable at high frequency, is geometrically precisely defined and has a high beam quality can be provided.

According to one exemplary embodiment, the device 100 is smaller than 8 millimeters. The device 100 may, for example, be produced for an installation space smaller than 5 millimeters×5 millimeters×5 millimeters. Said miniaturization of the device 100 is possible by virtue of the formation of the waveguides 125, 126, 127, which are not configured as glass fibers but are formed in the waveguide element 110 of the device 100. In this case, the waveguide element 110 is optionally produced as an optical chip, for example as a photonic integrated circuit.

Figure 2:
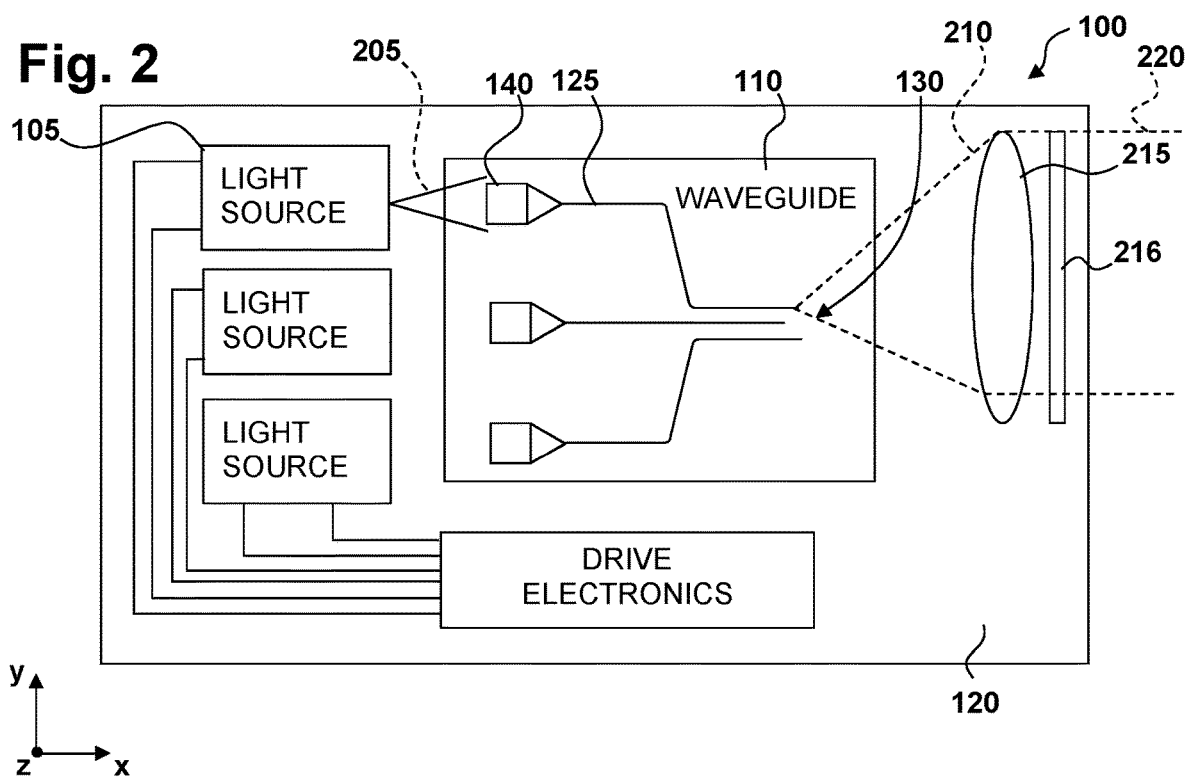

FIG. 2 shows a schematic representation of a device 100 for providing a multicolored light beam for a projector according to one exemplary embodiment. The overview representation of the device 100 as shown here corresponds substantially to FIG. 1, a beam path of light additionally being shown by way of example for the first light source 105. A light beam 205 is emitted by the first light source 105. The light beam 205 is input by means of the first input element 140 into the first waveguide 125 and is guided in the direction of the output region 130 of the waveguide element 110. A light beam 210 output from the first waveguide 125 from the output region 130 propagates in the direction of the beamforming device 115.

According to the exemplary embodiment shown here, the beamforming device 115 comprises at least one microlens 215 and one correction plate 216 for correcting a focal point of the microlens 215. The beamforming device 115 forms a light beam 220 for a projector from the light beam 210 output from the output region 130. Only the first light source 105 is active in the exemplary embodiment shown here, so that the light beam 220 is provided as a monochromatic light beam. If the second light source 106, and in addition or as an alternative the third light source 107, is furthermore active, the light output from the output region 130 is combined and the light beam 220 is provided as a multicolored light beam 220.

Figure 3A:
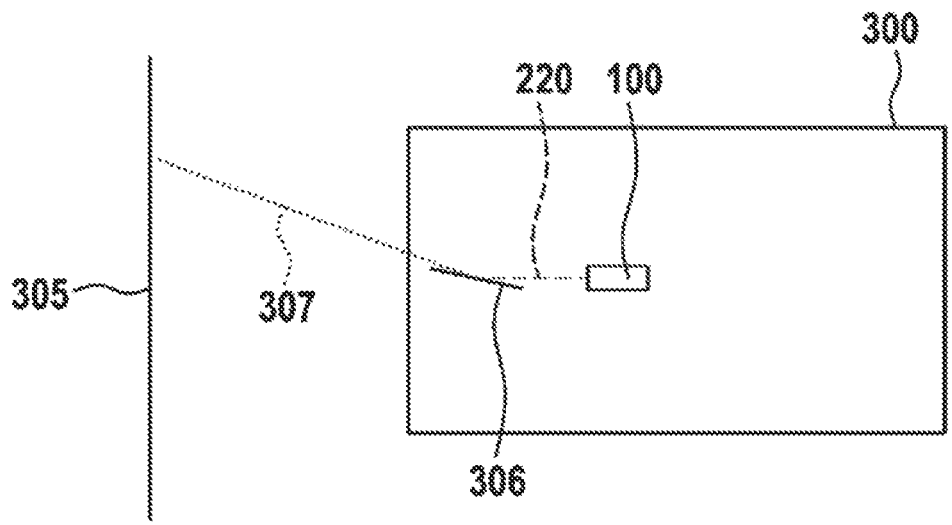
FIGS. 3a and 3b show schematic representations of a projector according to exemplary embodiments.

FIG. 3*a* shows a schematic representation of a projector 300 according to one exemplary embodiment. The projector 300 comprises a single devices 100 as described with the aid of the figures mentioned above. The projector 300 is configured to project an image onto the projection surface 305. For this purpose, the projector 300 comprises a mobile deflecting element 306, which is configured to deflect a light beam 220 provided by the device 100 in such a way that the light beam 220 as a projection beam 307 projects a pixel of the image onto the projection surface 305. By suitable driving of the device 100 and of the mobile deflecting element 306, the pixels of the image may be projected in chronological succession, for example row by row, onto the projection surface 305. For example, the mobile deflecting element 306 is configured as a micromirror, for example in the form of a MEMS micromirror, which deflects the light beam 220. A device 100 used as a light source module may therefore illuminate onto a MEMS micromirror which is used as a beam deflecting unit. Instead of a mobile deflecting element 306, another suitable deflecting element may be used for controlled deflection of the light beam 220.

Figure 3B:
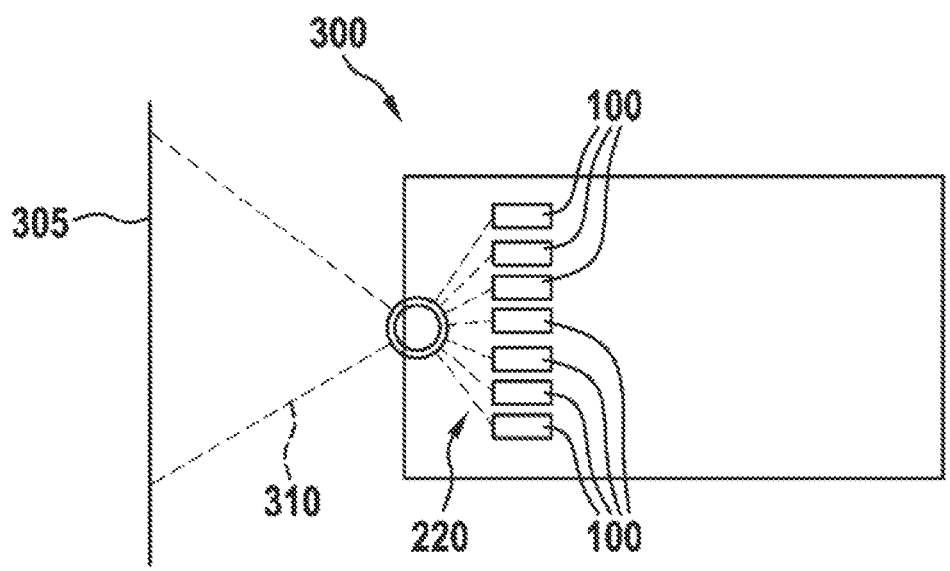

FIG. 3*b* shows a schematic representation of a projector 300 according to one exemplary embodiment. The projector 300 comprises a multiplicity of devices 100 as described with the aid of the figures mentioned above. The projector 300 is configured to project an image onto the projection surface 305. Each device 100 represents a light source of the projector 300 in order to project a pixel of the image onto the projection surface 305. The projector 300 is configured to form a projection beam 310 from the multicolored light beams 220 provided by the devices 100, in order to project the image.

The projectors 300 shown with the aid of FIGS. 3a and 3b may be produced as a miniaturized projector, for example a picoprojector, and used for example for smartglasses or wearable devices.

The use of an integrated waveguide element in a device 100 furthermore makes it possible to decouple geometrical tolerances of the light sources of the devices 100 from the geometrical tolerances of the light beam 220 provided by the device 100. The geometrical tolerances of the light sources therefore act less critically on the precision of the light beam 220. By virtue of these properties—the particularly small installation space, adaptability of the beam parameters and the lower requirements for the geometrical tolerances of the light sources the device 100 may be used as a multicolored light source module for high-resolution picoprojectors, such as the projector 300 shown here. In the case of using the projector 300 for smartglasses which function according to the principal of retinal projection, it is additionally advantageous that the beam parameters of the light beam 220 coincide precisely with a particular target value.

Figure 4:
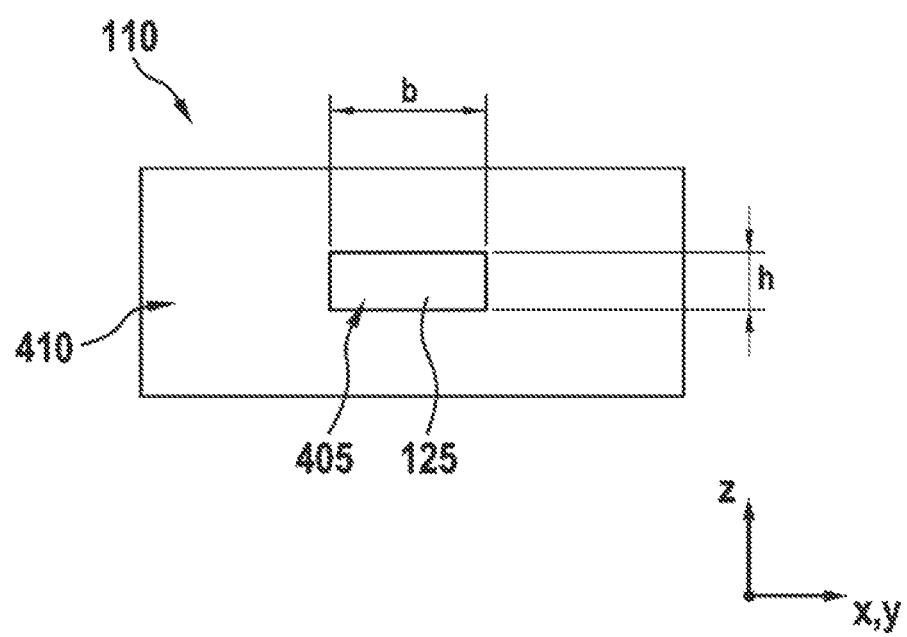
FIG. 4 to 6 show a schematic representation of a waveguide of a device for providing a multicolored light beam for a projector according to one exemplary embodiment.
Figure 5:
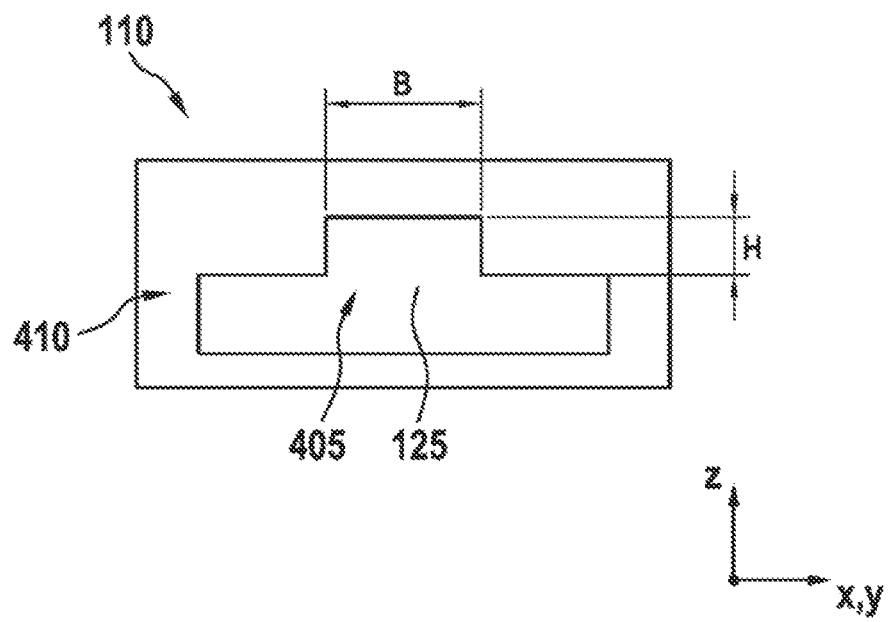
Figure 6:
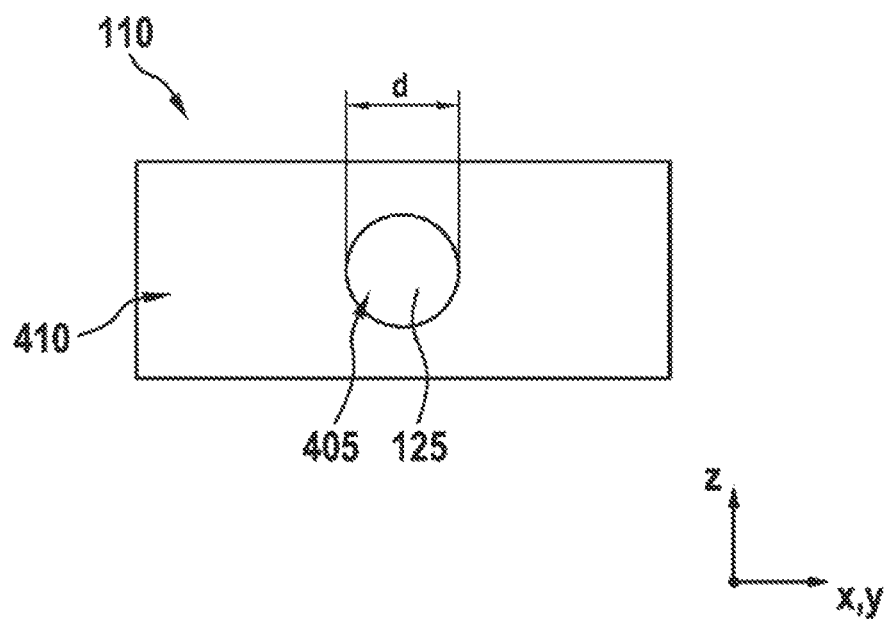

FIGS. 4 to 6 respectively show a schematic representation of a waveguide 125 of a device for providing a multicolored light beam for a projector according to one exemplary embodiment. By way of example, the first waveguide shown in FIG. 1 is in this case shown as a cross section. As an alternative, this and the following figures may also be a representation of the second or third waveguide shown in FIG. 1.

A cross section through a profile of the waveguide 125 which is formed in the waveguide element 110 is respectively shown. The waveguide 125 is formed by a core material 405, which is embedded in a cladding material 410 of the waveguide element 110. The waveguide 125 is formed for example as a dielectric waveguide, in which a core having a higher refractive index made of the core material 405 is enclosed by a cladding having a lower refractive index made of the cladding material 410. For example, silicon dioxide may be used as the cladding material 410 for the waveguide element 110, with silicon nitride, silicon oxynitride or lithium niobate as the core material 405 for the waveguide 125. As an alternative, a polymer or a hybrid polymer may also be used as cladding material 410, in which case the waveguide 125 may be formed in the waveguide element 110 by a lithographic exposure method. According to various embodiments, the waveguide 125 is formed as a strip waveguide or as a rib waveguide or as a cylindrical waveguide.

FIG. 4 shows the waveguide 125 in the configuration of the strip waveguide. As a stepped waveguide, the waveguide 125 has a rectangular shape. In this case, an extent of a width b of the waveguide 125 is more than two times as long as a height h of the waveguide 125 as a stepped waveguide, the height h being shown in an extent direction of the z axis.

FIG. 5 shows the waveguide 125 in the configuration of the rib waveguide. As a rib waveguide, the waveguide 125 has a stepped shape. The waveguide 125 has the shape of a winner's podium with three step levels, the two lateral steps being equally high. In this case, the lateral steps are stepped at a height H and the upper step has a width B. The steps have a comparable width B.

FIG. 6 shows the waveguide 125 in the configuration of the cylindrical waveguide, the waveguide 125 correspondingly having a cylindrical shape with a diameter d. Producing the waveguide 125 as a cylindrical waveguide is advantageous when the cladding material 410 is formed from a polymer or hybrid polymer.

Figure 7:
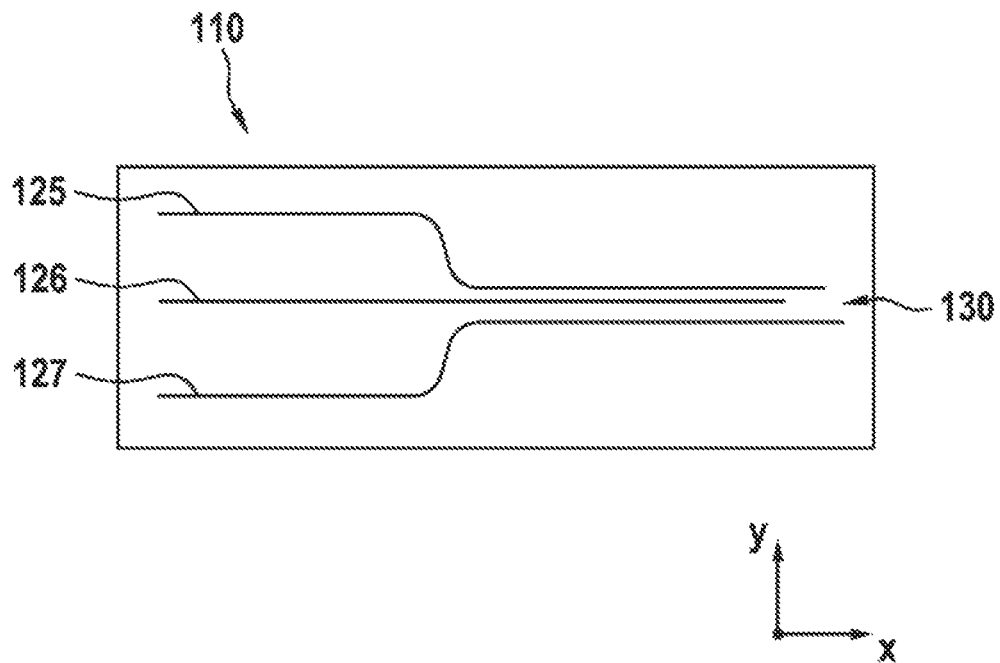
FIGS. 7 and 8 show a schematic representation of a waveguide element of a device for providing a multicolored light beam for a projector according to one exemplary embodiment.
Figure 8:
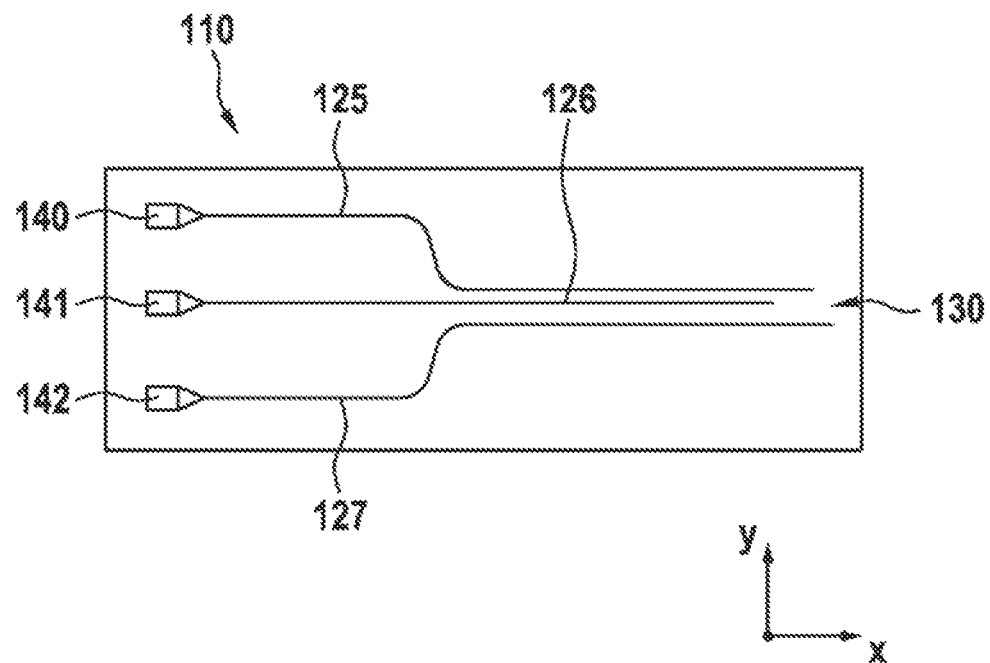

FIGS. 7 and 8 respectively show a schematic representation of a waveguide element 110 of a device for providing a multicolored light beam for a projector according to one exemplary embodiment. The profiles of the first waveguide 125, of the second waveguide 126 and of the third waveguide 127 in the waveguide element 110 are respectively shown. In FIG. 8, the waveguides 125, 126, 127 each additionally comprise the input element 140, 141, 142. The exemplary embodiments shown here of the waveguides 125, 126, 127 formed in the waveguide element 110 illustrate exemplary spacings between the individual waveguides 125, 126, 127.

The waveguides 125, 126, 127 are configured, according to one exemplary embodiment, as single-mode waveguides. Ends, formed in the output region 130, of the waveguides 125, 126, 127 are furthermore arranged at a different distance from the beamforming device. The waveguide element 110 has the purpose of providing a waveguide 125, 126, 127, which captures the light with a defined efficiency, for each light source. The waveguides 125, 126, 127 are for this purpose formed separately from one another on the waveguide element 110 and lead to the output region 130, where they are arranged close to one another and direct the light in a defined way onto the beamforming device. The waveguide element 110 and the waveguides 125, 126, 127 are for this purpose integrated, i.e. produced in a single component, and are not composed of different constituent parts, which advantageously is economical and allows a compact design.

The first waveguide 125 has a first distance from the second waveguide 126, which decreases starting from the input element 140 in the direction of the output region 130. The second waveguide 126 has a second distance, which is for example equal to the first distance, from the third waveguide 127, which decreases starting from the input element 140 in the direction of the output region 130. At a start of the waveguides 125, 126, 127, the distance between the individual waveguides 125, 126, 127 is for example defined by an extent and separation of the light sources 140, 141, 142, and the distance decreases in a section in the direction of the output region 130, for example to a physically minimum possible distance. In addition, the cross-sectional shape and position of the waveguide ends are variable and individually adaptable to the individual light sources 140, 141, 142, for example to colors of the light sources 140, 141, 142, so as to achieve the effect that the multicolored light beam to be formed has particular beam parameters for each color. In particular, the beam divergence may be selected to be the same for all colors. The waveguides 125, 126, 127 shown here correspondingly have different lengths and therefore different positions of the ends of the waveguides 125, 126, 127. The ends of the waveguides 125, 126, 127 are therefore arranged at different distances from an end, facing toward the beamforming device, of the waveguide element 110 or at different distances from the beamforming device.

The single-mode nature of the waveguides 125, 126, 127 is advantageous since a distribution of the light emitted at an end of the waveguide 125, 126, 127 is therefore not dependent on the properties of the light source. Manufacturing tolerances of the light source therefore do not affect the emitted light distribution, which is advantageous for use of the device in a projector since when all these beams have the same beam parameters (origin, direction, diameter and divergence angle), only a single instance of all subsequent optical elements, such as the beamforming device, is required. The identity of beam parameters may be achieved by the profiles of the waveguides 125, 126, 127 being adapted to the individual wavelengths—the longer the wavelength, the greater the height and width of the respective waveguide 125, 126, 127 are selected to be, and the waveguide end may furthermore be shaped and provided with further auxiliary elements, for example by a funnel-shaped widening or tapering of the 125, 126, 127, embedding in a larger waveguide, microlenses, micromirrors or combinations thereof, as shown with the aid of the subsequent figures. Identity of the beam origins is not fully achievable because of the separately held waveguides 125, 126, 127, but by close spacing of the ends of the waveguides 125, 126, 127 as it approximately produced. The minimum distance between two waveguides 125, 126, 127 is determined by the refractive index contrast between the core material and the cladding material of the waveguide element 110. The greater this refractive index contrast, the smaller the minimum distance between the waveguides 125, 126, 127 is. At the same time, the refraction contrast also influences the divergence angle, this being described in more detail with the aid of the subsequent figures.

Figure 9:
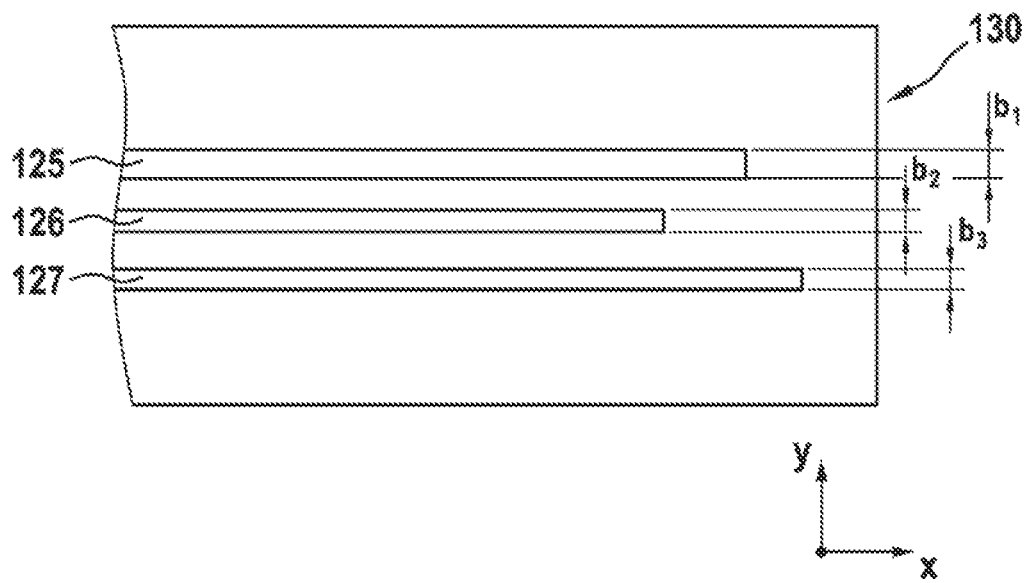
FIG. 9 to 11 show a schematic representation of a part of a waveguide element of a device for providing a multicolored light beam for a projector according to one exemplary embodiment.
Figure 10:
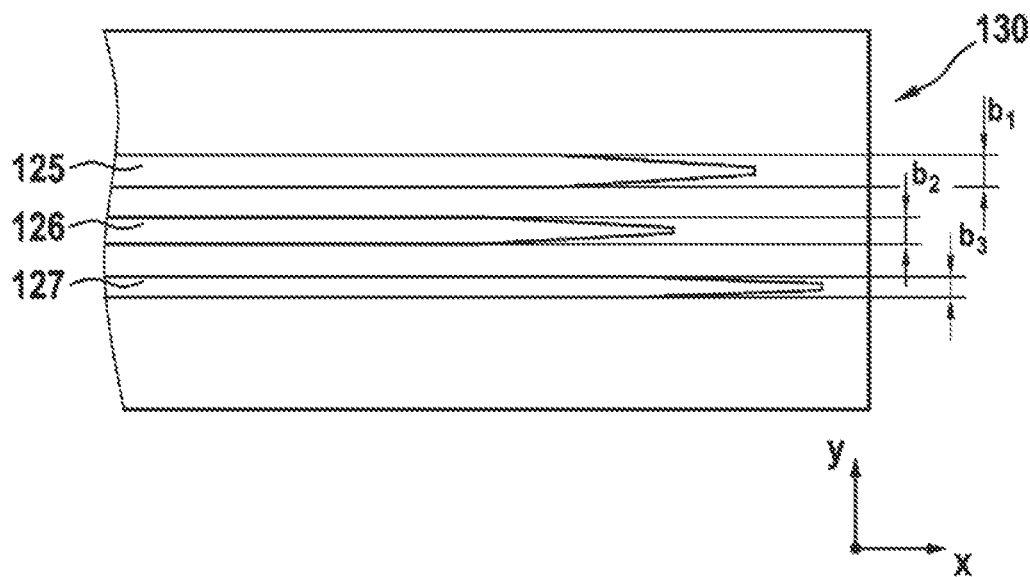
Figure 11:
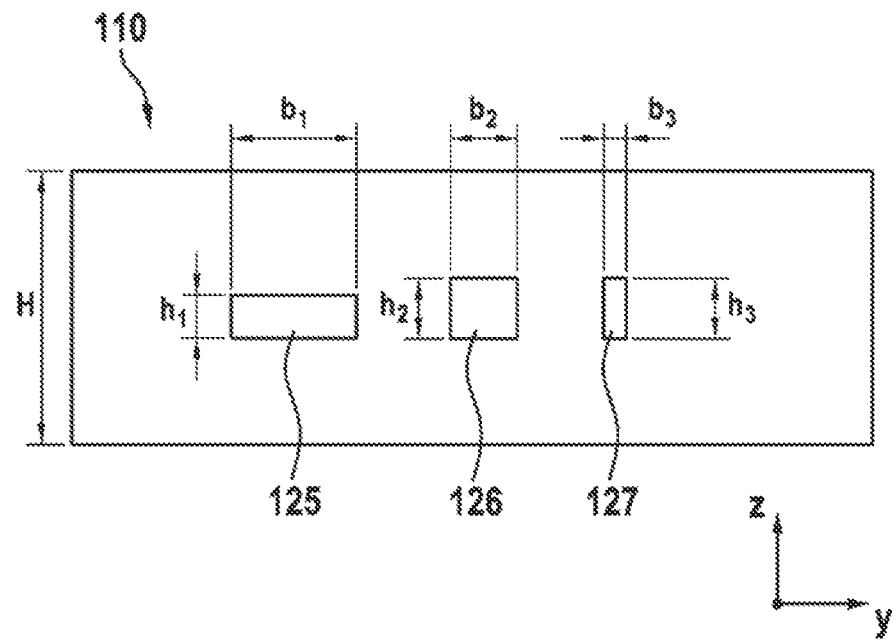

FIGS. 9 to 11 respectively show a schematic representation of a part of a waveguide element 110 of a device for providing a multicolored light beam for a projector according to one exemplary embodiment. Ends of the waveguides 125, 126, 127 and the output region 130 are shown as part of the waveguide element 110.

FIG. 9 shows exemplary positions and profiles of the waveguides 125, 126, 127. The first waveguide 125 has a width b1 which is greater than a width b2 of the second waveguide 126. The third waveguide 127 has a relatively smallest width b3. The end of the first waveguide 125 extends further into the output region 130 than the end of the second waveguide 126, and the end of the third waveguide 127 extends furthest into the output region. The different positions of the ends of the waveguides 125, 126, 127 and the different profile dimensions allow matching of the beam parameters of the light guided by the waveguides 125, 126, 127, which is advantageous in relation to a uniform beam diameter and the beam divergence of the multicolored light beam to be formed. The longer the wavelength of the light guided by the waveguide 125, 126, 127 is, the greater the height and width b1, b2, b3 of the respective waveguide 125, 126, 127 are selected to be.

FIG. 10 shows positions and profiles of the waveguides 125, 126, 127 which are similar to the exemplary embodiments described with the aid of FIG. 9, the different widths b1, b2, b3 of the waveguides 125, 126, 127 shown here thus respectively also corresponding to the exemplary embodiment shown in FIG. 9. In addition, the ends of the waveguides 125, 126, 127 in the exemplary embodiment shown here respectively have a tapering. The taperings of the waveguides 125, 126, 127 are different. The tapering of the waveguides 125, 126, 127 is also advantageous for a desired identity of the beam parameters of the light guided by the waveguides 125, 126, 127.

FIG. 11 shows cross sections of the profiles of the waveguides 125, 126, 127, a height H of the waveguide element 110 correspondingly being marked here. The profiles shown here of the waveguides 125, 126, 127 differ: the first waveguide 125 is formed as a flat rectangle and has a width b1 which is at least two times as long as a height h1 of the first waveguide 125. The second waveguide 126 has an almost square profile, a height h2 of the second waveguide 126 corresponding approximately to a width b2 of the second waveguide 126. The third waveguide 127 is configured as a tall rectangle, a height h3 of the third waveguide 127 being more than two times as long as a width b3. The difference of the cross sections of the waveguides 125, 126, 127 is also advantageous for matching of the beam parameters.

Figure 12:
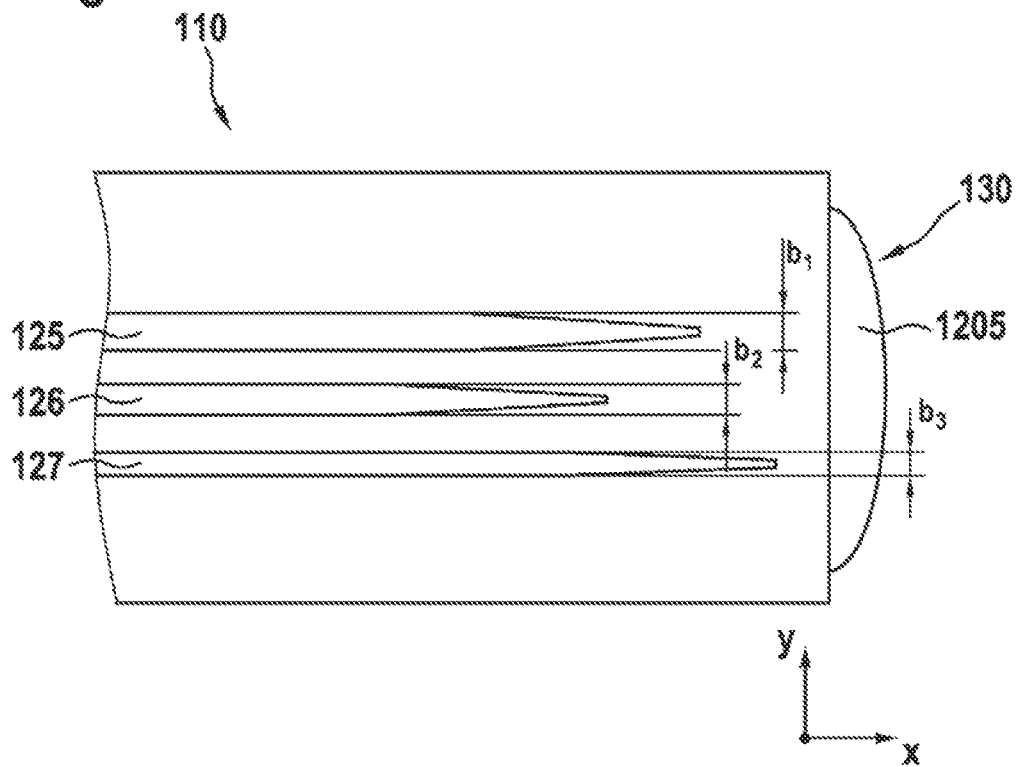
FIG. 12 to 15 show a schematic representation of a part of a waveguide element, having a beam parameter auxiliary element, of a device for providing a multicolored light beam for a projector according to one exemplary embodiment.
Figure 13:
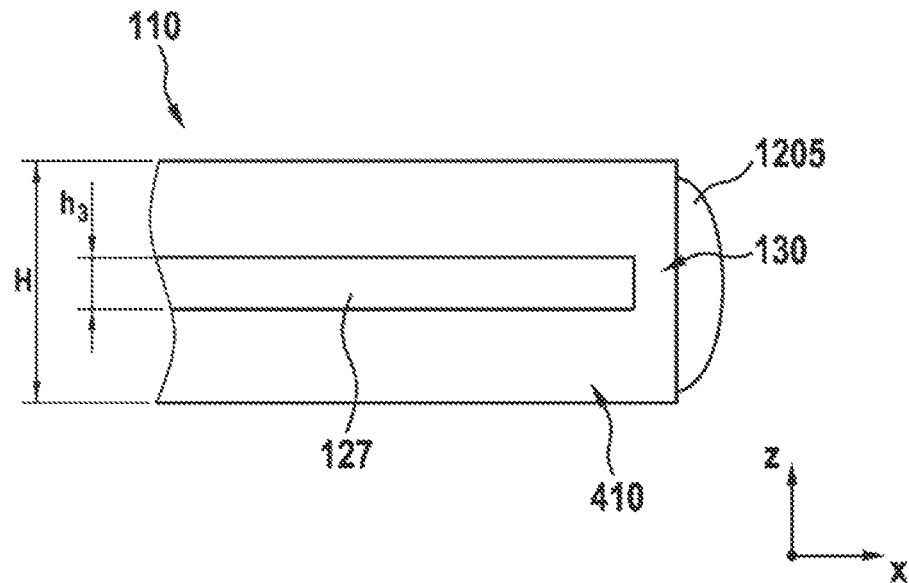
Figure 14:
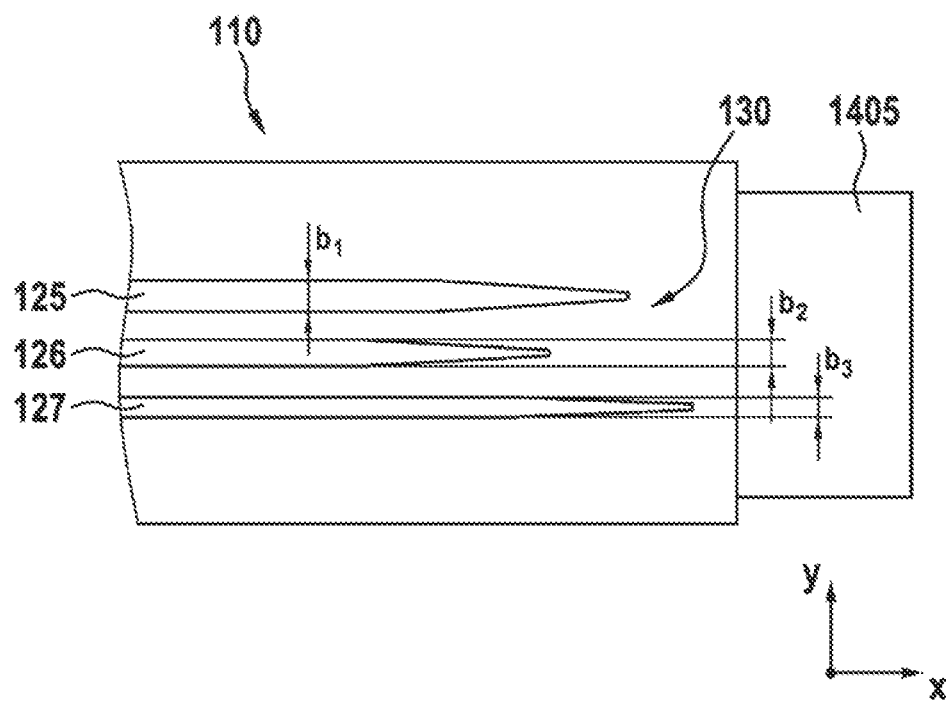
Figure 15:
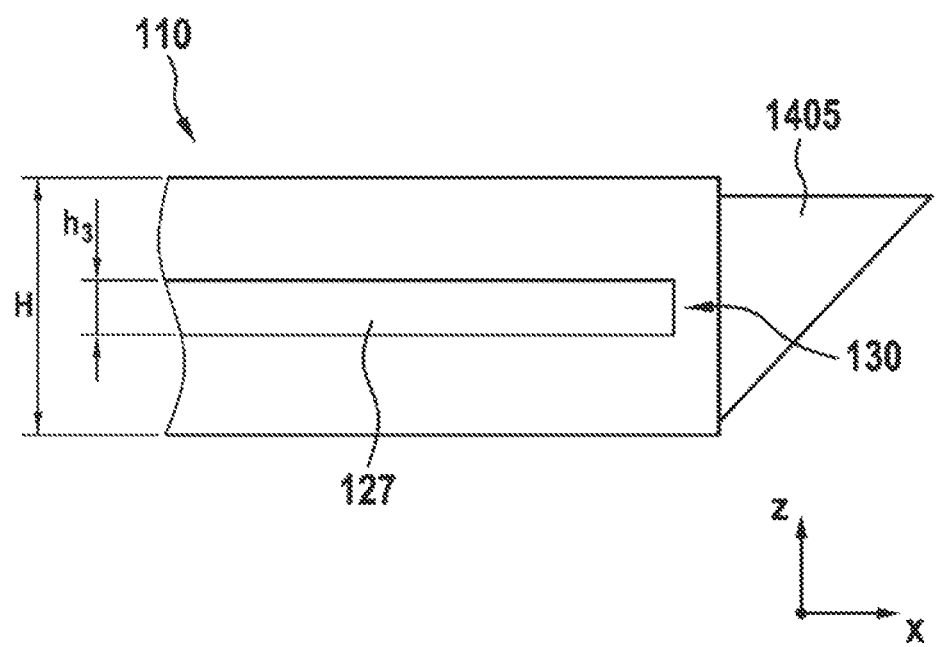

FIGS. 12 to 15 respectively show a schematic representation of a part of a waveguide element 110, having a beam parameter auxiliary element, of a device for providing a multicolored light beam for a projector according to one exemplary embodiment. Ends of the waveguides 125, 126, 127 and the output region 130 are shown as part of the waveguide element 110. As the beam parameter auxiliary element, a microlens 1205 is shown in FIGS. 12 and 13 and a micromirror 1405 on the waveguide element 110 is shown in FIGS. 14 and 15. The beam parameter auxiliary element is configured to achieve matching of the beam parameters of the beams guided by the waveguides 125, 126, 127.

FIG. 12 shows a plan view of the waveguide element 110. The ends of the waveguides 125, 126, 127 have a tapering. The widths b1, b2 and b3 of the waveguides 125, 126, 127 are furthermore different, as described with the aid of FIGS. 9 and 10. According to the exemplary embodiment shown here, a microlens is arranged adjacent to the output region 130 at one end of the waveguide element 110. Matching of the beam parameters of the waveguides 125, 126, 127 is achieved by the variation shown here of the widths b1, b2, b3 of the waveguides 125, 126, 127 and the arrangement of the microlens 1205.

FIG. 13 shows a sectional representation of the exemplary embodiment shown in FIG. 12. The height H of the waveguide element 110 and the height h3 of the third waveguide 127 are shown. The height H shows the height of the cladding material 410 of the waveguide element 110. The cladding material 410 is, according to the exemplary embodiment shown here, used as an additional larger waveguide for the waveguides 127 embedded in the waveguide element 110, which open into the output region in the cladding material 410 of the waveguide element 110. The cladding material 410 in this case influences the beam parameters of the light output from the waveguides 127, which contributes to matching of the beam parameters.

FIG. 14 shows a plan view of the waveguide element 110. The exemplary embodiment shown here is similar in the configuration and position of the waveguides 125, 126, 127 to the exemplary embodiment described with the aid of FIG. 12 with the corresponding respectively different widths b1, b2, b3 and the waveguides 125, 126, 127 and the tapering at the end of each waveguide 125, 126, 127. Here, however, the micromirror 1405, which is formed to match the beam parameters of the light guided by the waveguide 125, 126, 127, is arranged next to the output region 130.

FIG. 15 shows a sectional representation of the exemplary embodiment shown in FIG. 14. The height H of the waveguide element 110 and the height h3 of the third waveguide 127 are shown. The configuration of the micromirror 1405 can furthermore be seen here. The micromirror is configured as a right-angled triangle, the hypotenuse of the triangle extending in the extent direction of the z axis.

Figure 16:
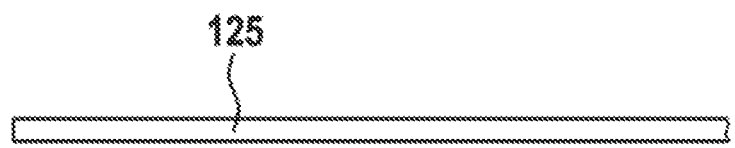
FIG. 16 to 18 show a schematic representation of a start of a waveguide of a device for providing a multicolored light beam for a projector according to one exemplary embodiment.
Figure 16:
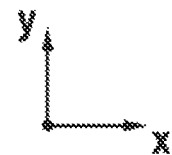
Figure 17:
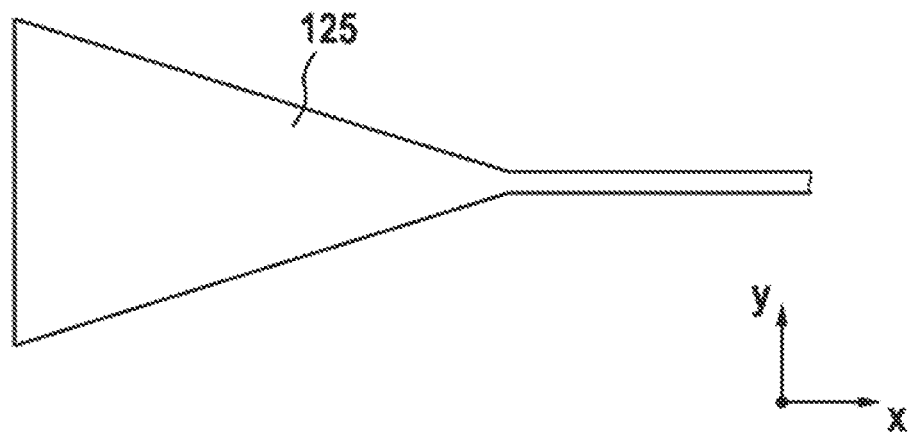
Figure 18:
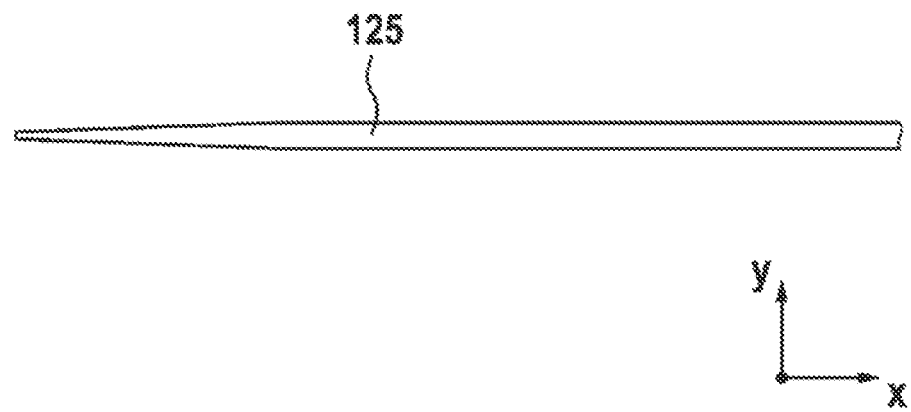

FIGS. 16 to 18 respectively show a schematic representation of a start of a waveguide 125, here likewise merely by way of example of the first waveguide shown in FIG. 1, of a device for providing a multicolored light beam for a projector according to one exemplary embodiment. The start of the waveguide 125 shown is formed to input light provided by the light source. By the configurations shown here of the start of the waveguide 125 and by input elements as shown with the aid of FIG. 19 to 21, it is possible to adjust position tolerances of the light sources with respect to the waveguide element and therefore with respect to the waveguide 125. It is advantageous for the position tolerances to be several micrometers in size, in order to be able to achieve them by means of an automatic fitting machine. A different configuration of the start of the waveguide 125 is advantageous in order to input light with a well-defined efficiency from the light sources into the waveguides 125.

FIG. 16 shows, as the start of the waveguide 125, a height and width extending uniformly over the length of the waveguide 125, which are not changed relative to the further extent of the waveguide 125, i.e. no tapering or widening is formed at the start of the waveguide 125.

FIG. 17 shows a funnel-shaped widening at the start of the waveguide 125. The width of the waveguide 125 is greater at the start and a multiple than in the further extent of the waveguide 125, for example as shown here by 15 times. The funnel-shaped widening shown here may be referred to as an input element. In addition, the funnel-shaped widening of the start of the waveguide 125 may be combined with an input element, as shown subsequently in FIG. 19.

FIG. 18 shows a tapering at the start of the waveguide 125. For this purpose, the waveguide 125 is formed converging to a point in the direction of the start, with a uniformly extending tapering. At one end of the tapering of the waveguide 125, the width of the waveguide 125 is for example one third of the width in comparison with the further extent of the waveguide 125. The tapering here may also be referred to as an input element, or may be combined with other input elements, for example with use of a microlens or of a micromirror as an input element, or of an input element shown in the subsequent figures, such as a grating coupler.

Figure 19:
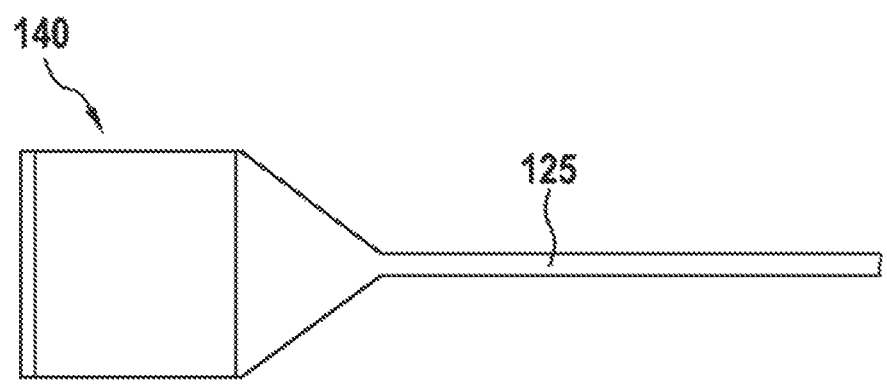
FIG. 19 to 21 show a schematic representation of an input element of a waveguide element of a device for providing a multicolored light beam for a projector according to one exemplary embodiment.
Figure 20:
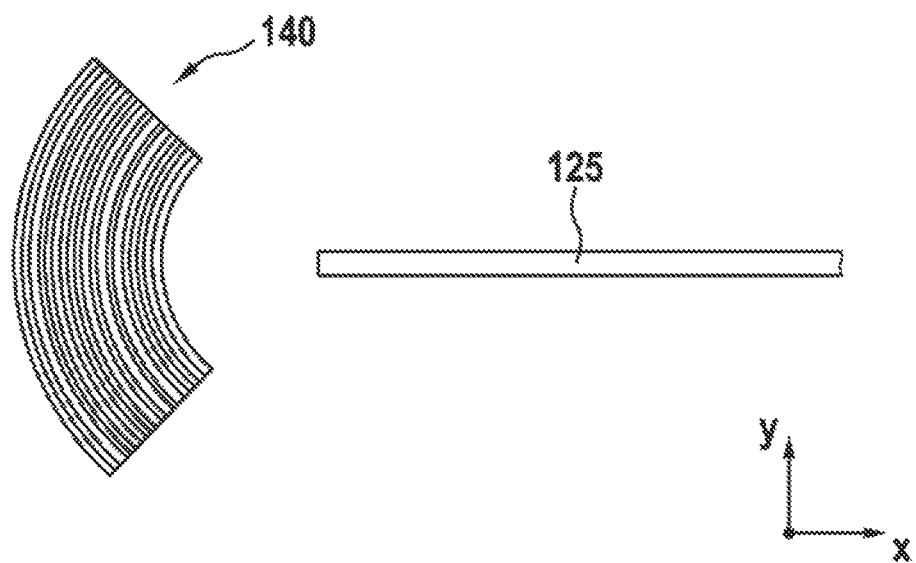
Figure 21:
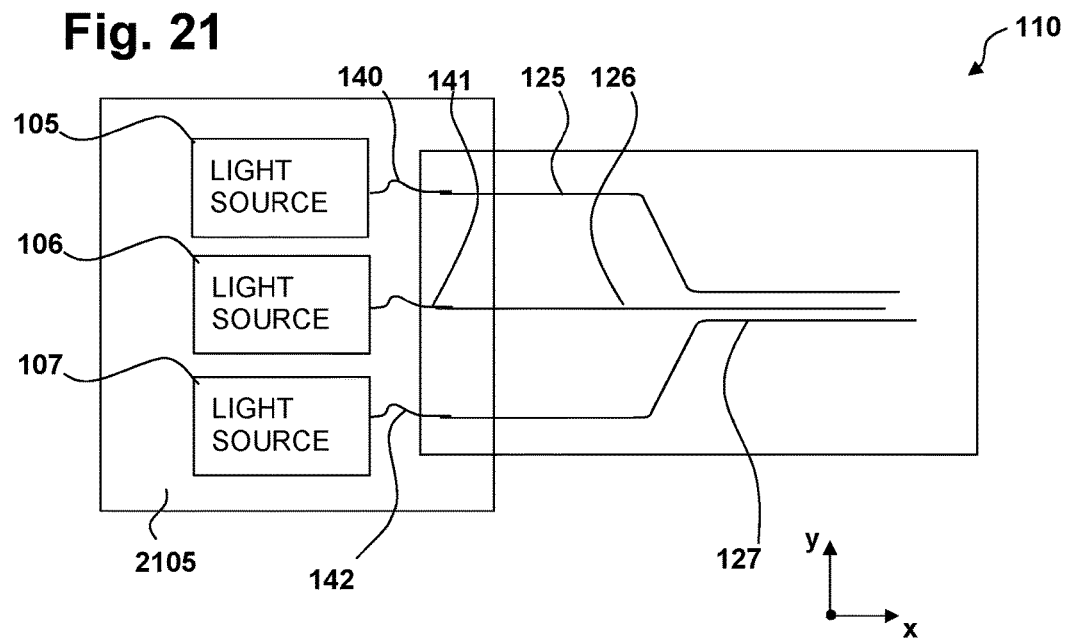

FIGS. 19 to 21 respectively show a schematic representation of an input element 140, 141, 142 of a waveguide element 110 of a device for providing a multicolored light beam for a projector according to one exemplary embodiment. According to one exemplary embodiment, the waveguide element 110 forms the input element 140, 141, 142 for the waveguides 125, 126, 127. The input element 140, 141, 142 may be produced as a region of the waveguides 125, 126, 127, i.e. on the waveguide element. As an alternative, a further waveguide may be arranged as an input element 140, 141, 142 between the waveguides 125, 126, 127 embedded in the waveguide element 110 and the light source, as shown with the aid of FIG. 21.

FIG. 19 shows, by way of example, the waveguide 125 having the funnel-shaped widening at the start of the waveguide 125 and having a grating coupler embedded in the funnel as an input element 140.

FIG. 20 shows, by way of example, the waveguide 125 with a waveguide 125 extending uniformly in respect of height and width without widening or tapering at the start of the waveguide 125. A focusing grating coupler, which is not formed as part of the waveguide 125 but is arranged at a distance from the start of the waveguide 125, is shown as an input element 140.

FIG. 21 shows a plan view of the waveguide element 110 in which the waveguides 125, 126, 127 are formed, and of the light sources 105, 106, 107. The light sources 105, 106, 107 are arranged on a polymer 2105. Furthermore, the polymer 2105 is arranged partially overlapping on the waveguide element 110, so that a start of the waveguides 125, 126, 127 is respectively covered by the polymer 2105.

A further waveguide as an input element 140, 141, 142 is respectively arranged between the first light source 105 and the first waveguide 125, the second light source 106 and the second waveguide 126, and the third light source 107 and the third waveguide 127. For this purpose, the further waveguides as input elements 140, 141, 142 are for example scribed into the polymer 2105, or alternatively into a hybrid polymer, by means of a lithographic exposure method. In this case, the position tolerances of the light sources 105, 106, 107 with respect to the waveguide element 110 are greater than without a waveguide as an input element 140, 141, 142. In the case of weak light sources 105, 106, 107, it is advantageous to configure the input elements 140, 141, 142 for a particularly high efficiency. In the case of strong light sources 105, 106, 107, on the other hand, it is advantageous to configure the input elements 140, 141, 142 in such a way that they reflect or absorb a defined part of the light power. This may increase the safety in respect of avoiding potential eye damage when operating a projector with the device as a projector light source.

Figure 22:
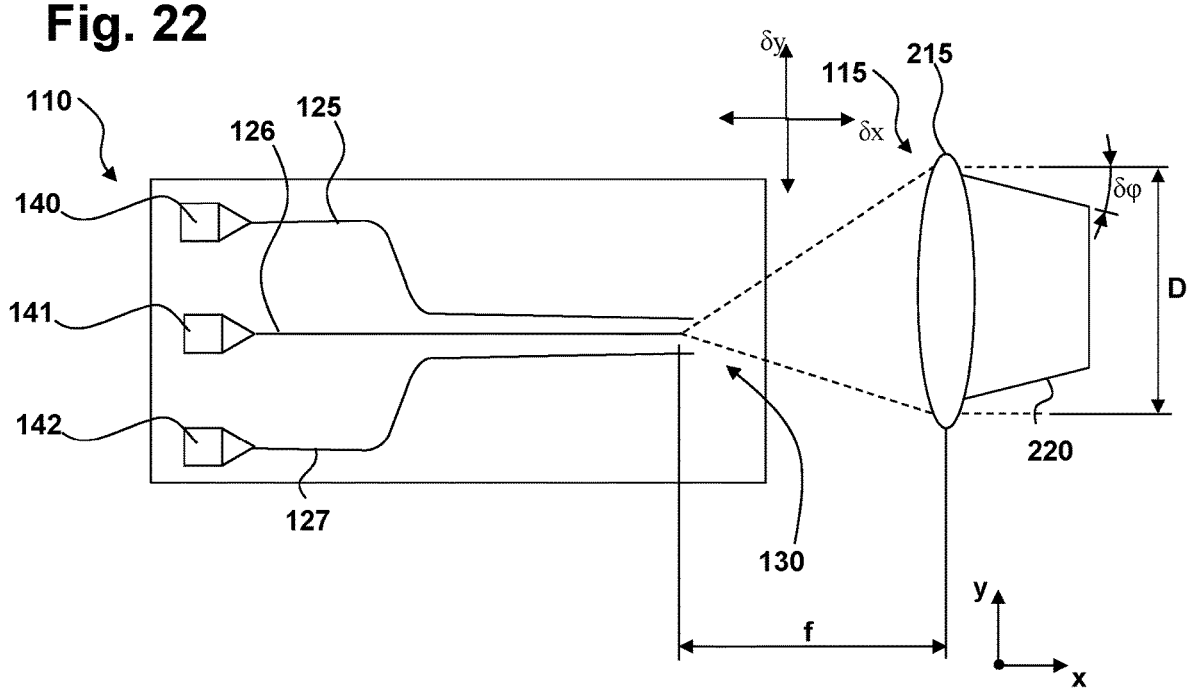
FIG. 22 shows a schematic representation of a waveguide element and of a beamforming device of a device for providing a multicolored light beam for a projector according to one exemplary embodiment.

FIG. 22 shows a schematic representation of a waveguide element 110 and of a beamforming device 115 of a device for providing a multicolored light beam for a projector according to one exemplary embodiment. The waveguide element 110 in this case comprises the first waveguide 125, the second waveguide 126 and the third waveguide 127, which respectively have a funnel-shaped widening and a grating coupler as an input element 140, 141, 142 at the start. The beamforming device 115 in this case comprises, for example, the microlens 215. In this representation, adjustment tolerances δx, δy, δz between the waveguide element 110 and the microlens 215 are shown. A focal length f of the microlens 215, a beam divergence δφ and a diameter of the light beam 220 formed by the beamforming device 115 are furthermore shown. The adjustment tolerance δy tilts the beam, although this is unimportant for the application described here. The adjustment tolerance δx changes the beam divergence δφ. If the device is miniaturized, the focal length f decreases and the sensitivity of the beam divergence δφ to the tolerance δx increases, as shown by the following formula:

$$\delta\varphi = \delta x * \frac{D}{2f^2}$$

By using the integrated waveguide element 110, the relative positions of the ends of the waveguides 125, 126, 127, i.e. the mutual spacings and the length of the waveguides 125, 126, 127, are defined very precisely. For this reason, the adjustment problem is advantageously reduced to a single degree of freedom, namely δx.

For a small beam divergence of the light beam 220, it is advantageous for the output region 130 with the ends of the waveguides 125, 126, 127 to be located at or in the vicinity of the focal point of the beamforming device 115. The smaller the device is made, the more important this distance is. In contrast to production with glass fibers, in the case of the device shown here miniaturization is possible as a multicolored light source module, for example with said dimensions in the range of 5 cubic millimeters. In this case, the high achievable precision of lithographically producible integrated waveguides 125, 126, 127 is used in the waveguide element 110 in order to avoid cost-intensive tolerance problems. For this purpose, the relative positions of the ends of the waveguides 125, 126, 127 in the output region 130 are produced with high precision by an integrated production method of the waveguide element 110. In this way, it is then only necessary to adjust a single degree of freedom: the distance f between the beamforming element of the beamforming device 115 and the output region 130. In order to carry this out economically as well, it may be advantageous to divide the beamforming device 115 into a plurality of component subparts, as shown by way of example with the aid of FIG. 2. In particular, it is possible to use a microlens whose focal length is initially not known accurately enough, and this may be integrated into the device by a method whose position tolerances are not accurate enough to achieve the beam divergence required for the projector. After the integration of the microlens, the beam divergence actually achieved is measured and a suitable correction plate—a lens with a low refractive power—may be introduced behind the microlens in order to correct the error in the beam divergence. In this embodiment, the beamforming device 115 consists of two component parts, namely the microlens and the correction plate.

Figure 23:
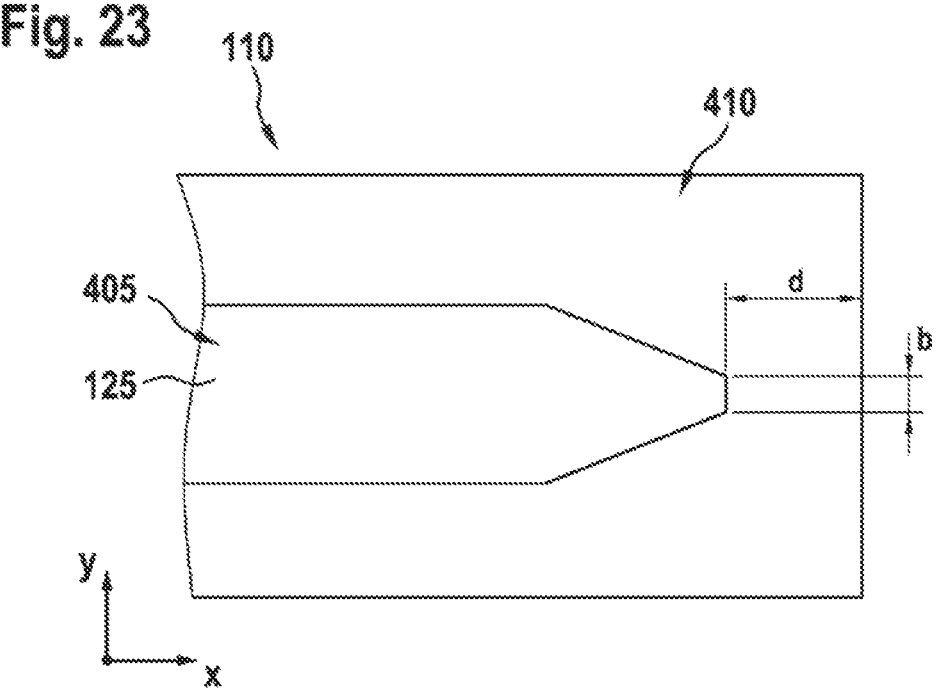
FIG. 23 to 25 show a schematic representation of an end of a waveguide of a device for providing a multicolored light beam for a projector according to one exemplary embodiment.
Figure 24:
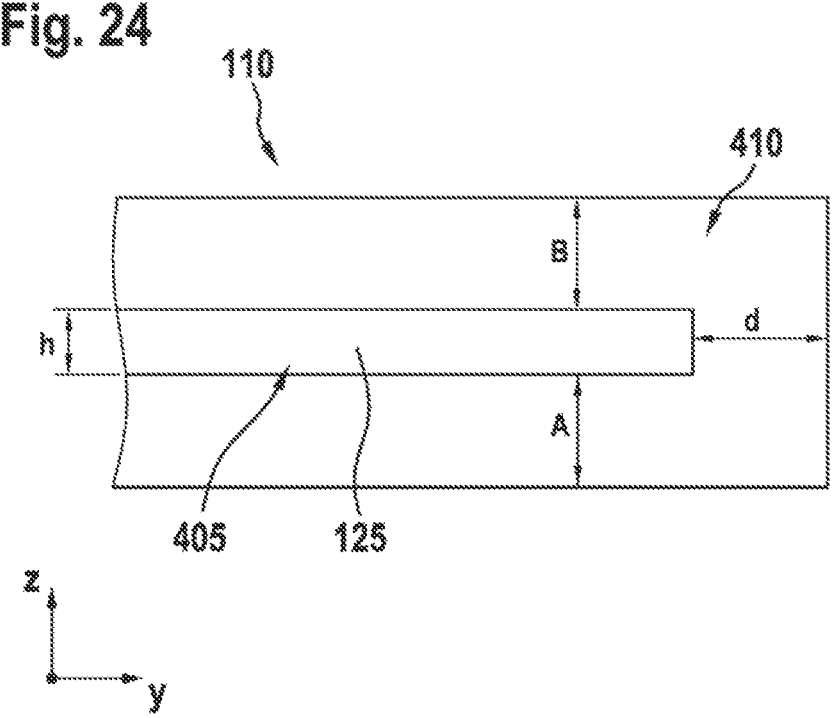
Figure 25:
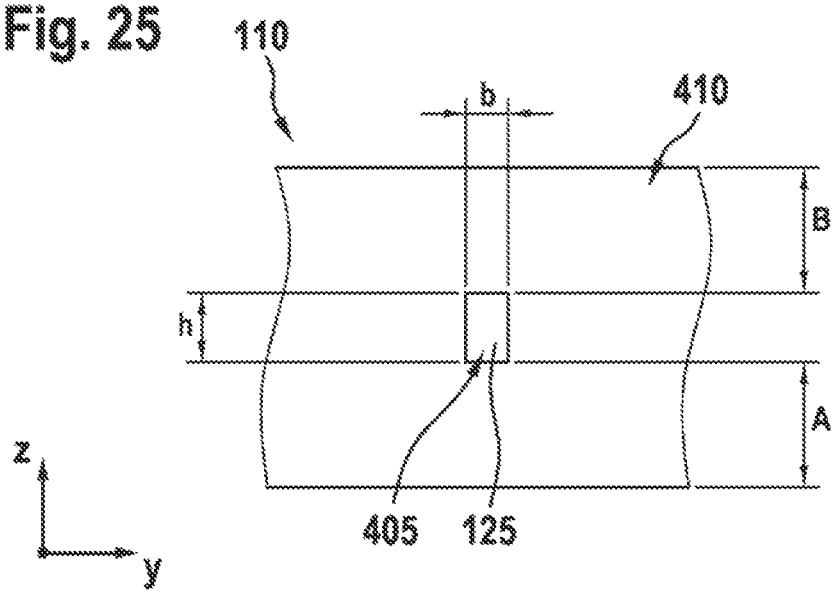

FIGS. 23 to 25 respectively show a schematic representation of an end of a waveguide 125 of a device for providing a multicolored light beam for a projector according to one exemplary embodiment. Different views of the waveguide 125, which illustrates diffraction at an end of the waveguide 125, are shown. The core material 405 of the waveguide 125 has a refractive index $n_1$, and the cladding material 410 of the waveguide element 110 has a refractive index $n_2$.

FIG. 23 shows a plan view of the end of the waveguide 125. Since end of the waveguide 125 in this case has a conical tapering. The width b of the waveguide 125 and the distance d between the end of the waveguide 125 in the direction of the beamforming device and an end of the waveguide element 110 are furthermore shown.

FIG. 24 shows a longitudinal section of the end, shown in FIG. 23, of the waveguide 125. It shows the height h of the waveguide 125 as well as the distance d. A distance A between a lower end of the waveguide 125 and of the waveguide element 110, as well as a distance B between an upper end of the waveguide 125 and of the waveguide element 110, are furthermore shown.

FIG. 25 shows a cross section of the end, shown in FIG. 23, of the waveguide 125. Correspondingly, the height h and the width b of the end of the waveguide 125, as well as the distance A and the distance B, are shown.

Figure 26:
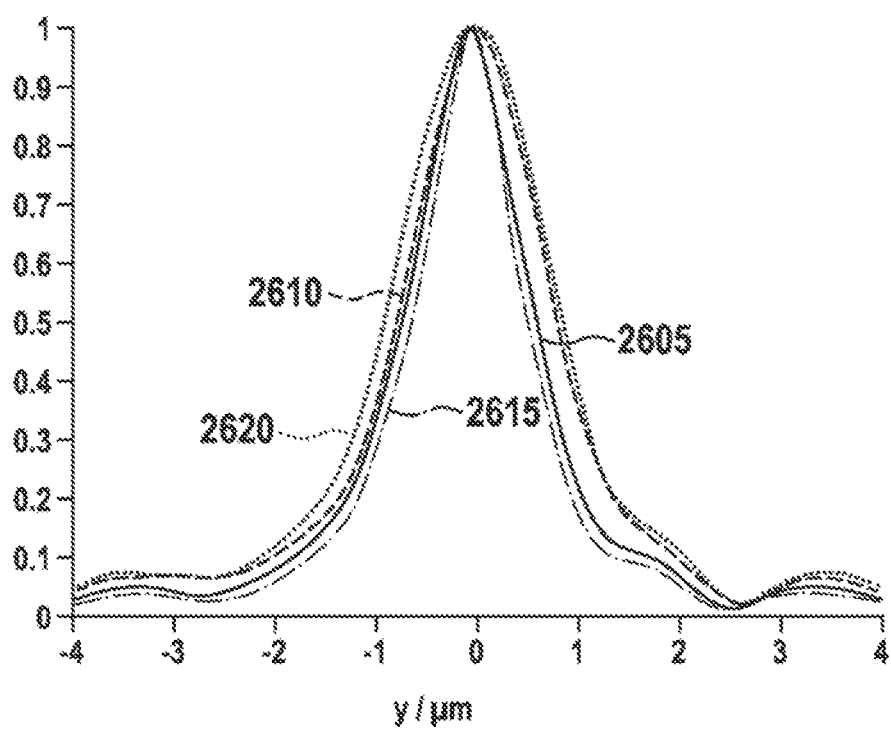
FIGS. 26 and 27 show characteristic curves of an intensity distribution of light at an end of a waveguide of a device for providing a multicolored light beam for a projector according to one exemplary embodiment.
Figure 27:
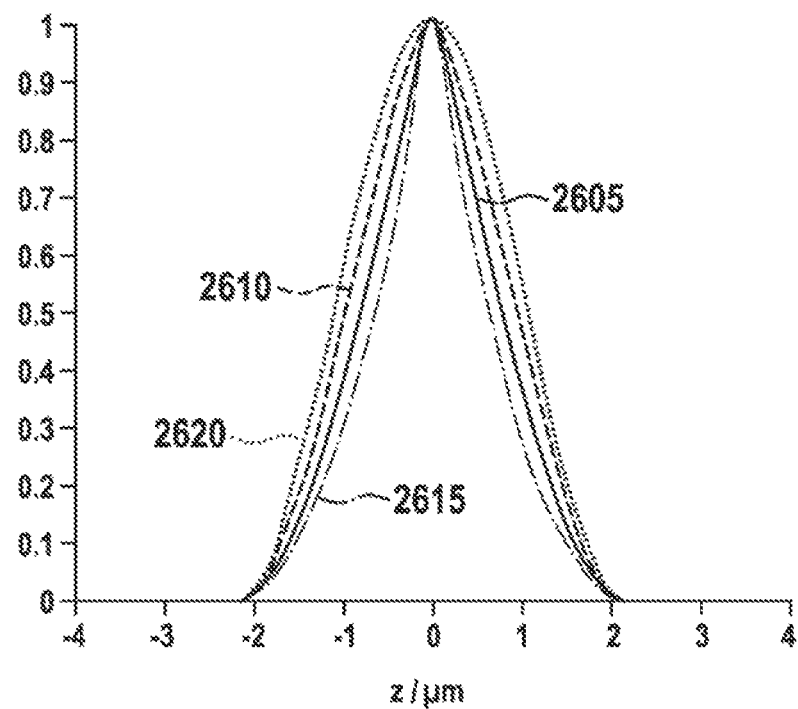

FIG. 26 and FIG. 27 show characteristic curves 2605, 2610, 2615, 2620 of an intensity distribution of light at an end of a waveguide of a device for providing a multicolored light beam for a projector according to one exemplary embodiment. The characteristic curves 2605, 2610, 2615, 2620 are shown in a coordinate system in which the intensity is plotted on the ordinate. Values of the y axis in μm are plotted on the abscissa in FIG. 26, and values of the z axis in μm are plotted on the abscissa in FIG. 27. Correspondingly, FIG. 26 shows a mode profile of the waveguide in y section and FIG. 27 shows a mode profile of the waveguide in z section. The characteristic curves 2605, 2610, 2615, 2620 show an adjustability of an intensity distribution emerging at the end of the waveguide for the cross section, shown in FIG. 25, of the end, embedded in the waveguide element, of the waveguide. The characteristic curve 2605 shows the intensity distribution of the light emerging at the end of the waveguide with the following parameter configuration: a height h of 200 nm, a width b of 80 nm, a distance d of 0 nm, a refractive index $n_1$ of the core material of the waveguide of 1.6, a refractive index $n_2$ of the cladding material of the waveguide element of 1.5, a distance A of 1900 nm, a distance B of 1900 nm and a light wavelength in a vacuum $\lambda_0$ of 500 nm. The characteristic curves 2610, 2615, 2620 show the way in which the intensity distribution of the light emerging at the end of the waveguide is changed by changing a geometrical parameter which defines the end of the waveguide. Since the waveguide is configured according to one exemplary embodiment as a single-mode waveguide, the intensity distribution does not depend on the properties of the light source, for example a laser. It can furthermore be seen that a further waveguide may already be placed at a distance of about 3 μm from the waveguide, which advantageously saves space. The characteristic curve 2610 shows the intensity distribution of the light emerging at the end of the waveguide in the event of a change in the height of the waveguide, the parameter h, which is in this case 100 nm for the characteristic curve 2610, in contrast to the reference, the characteristic curve 2605. The characteristic curve 2615 shows the intensity distribution of the light emerging at the end of the waveguide in the event of a change in the width b, which is in this case 120 nm for the characteristic curve 2615, in contrast to the characteristic curve 2605. The characteristic curve 2620 shows the intensity distribution of the light emerging at the end of the waveguide in the event of a change in the distance d, which is in this case 2000 nm for the characteristic curve 2620, in contrast to the characteristic curve 2605.

Figure 28:
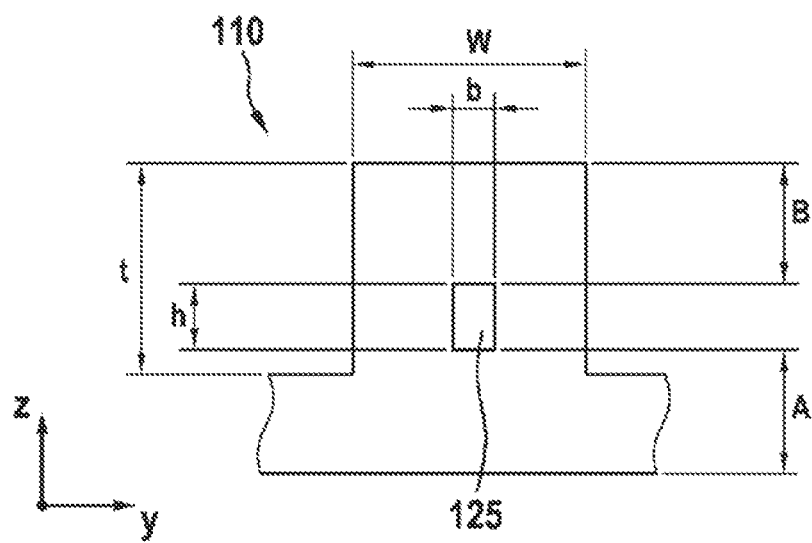
FIG. 28 shows a schematic representation of an end of a waveguide of a device for providing a multicolored light beam for a projector according to one exemplary embodiment.

FIG. 28 is a schematic representation of an end of a waveguide 125 of a device for providing a multicolored light beam for a projector according to one exemplary embodiment. A cross section of the waveguide 125, which is embedded in the waveguide element 110, is shown by way of example. The waveguide element 110 is in this case configured as a structured cladding. The waveguide 125 has the height h, the width b, the distance A and the distance B. The waveguide element 110 is configured as a rib waveguide and has a step height t and a step width w.

Figure 29:
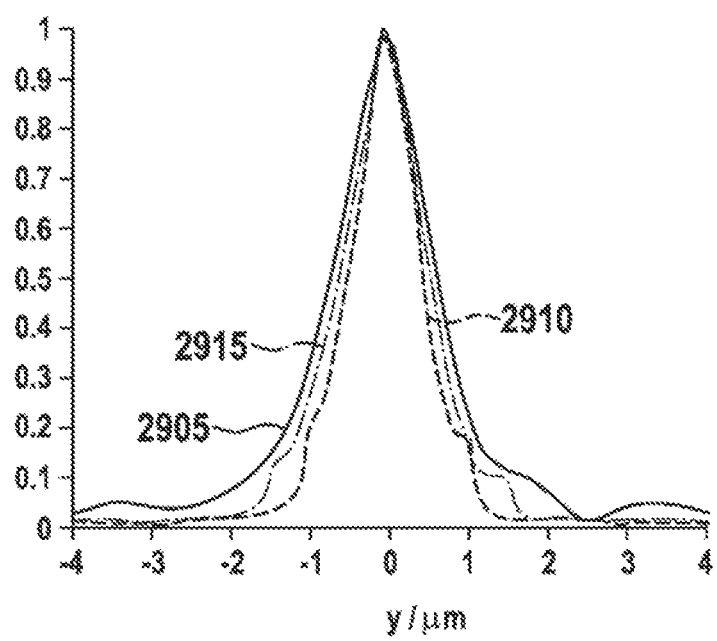
FIG. 29 to 32 show characteristic curves of an intensity distribution of light at an end of a waveguide of a device for providing a multicolored light beam for a projector according to one exemplary embodiment.
Figure 30:
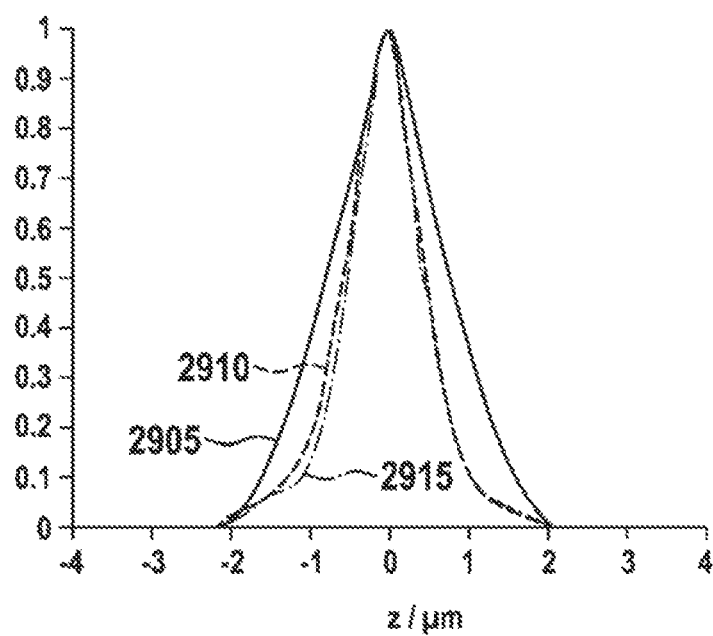
Figure 31:
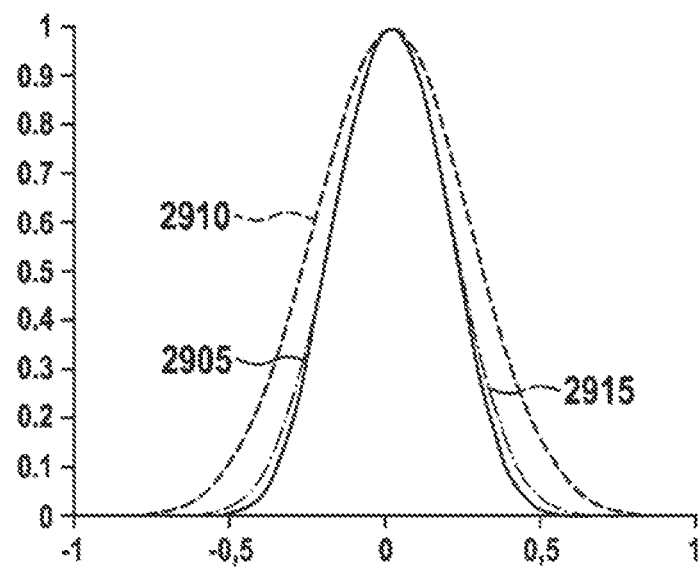
Figure 32:
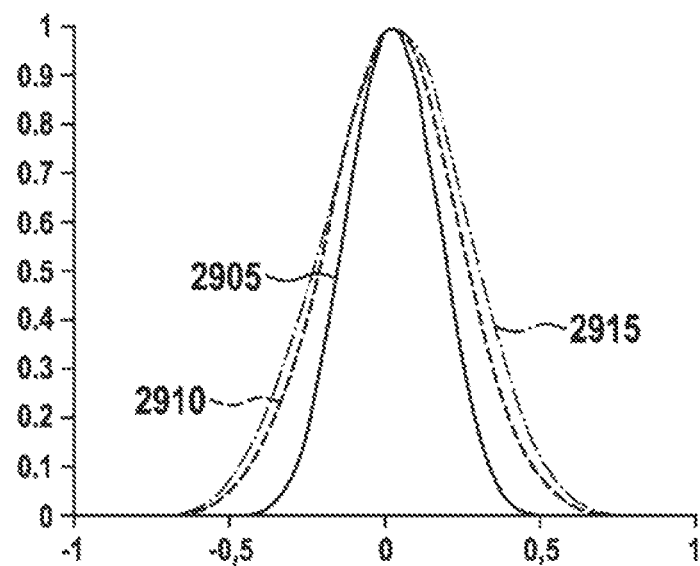

FIG. 29 to 32 show characteristic curves 2905, 2910, 2915 of an intensity distribution of light at an end of a waveguide of a device for providing a multicolored light beam for a projector according to one exemplary embodiment. The characteristic curves 2905, 2910, 2915 are respectively shown in a coordinate system in which the intensity is plotted on the ordinate. Values of the y axis in μm are plotted on the abscissa in FIG. 29, values of the z axis in μm are plotted on the abscissa in FIG. 30, the numerical y aperture is plotted on the abscissa in FIG. 31 and the numerical z aperture is plotted on the abscissa in FIG. 32. FIG. 29 shows a mode profile of the waveguide in y section, FIG. 30 shows a mode profile of the waveguide in z section, FIG. 31 shows an emission characteristic of the waveguide in y section and FIG. 32 shows an emission characteristic of the waveguide in z section. The characteristic curves 2905, 2910, 2915 show an adjustability of an intensity distribution emerging at the end of the waveguide for the cross section, shown in FIG. 28, of the end, embedded in the waveguide element, of the waveguide. The characteristic curve 2905 shows the intensity distribution of the light emerging at the end of the waveguide with the following parameter configuration: a height h of 200 nm, a width b of 80 nm, a refractive index $n_1$ of the core material of the waveguide of 1.6, a refractive index $n_2$ of the cladding material of the waveguide element of 1.5, a distance A of 1900 nm, a distance B of 1900 nm and a light wavelength in a vacuum $\lambda_0$ of 500 nm. The characteristic curve 2905 may also be referred to as a reference. The parameter t, the step height of the waveguide element, is 2 μm for the characteristic curves 2910 and 2915. The characteristic curves 2910 and 2915 show the way in which the intensity distribution of the light emerging at the end of the waveguide is changed by changing a geometrical parameter, which a shape of the cladding of the waveguide, of the waveguide element. The characteristic curves 2910 and 2915 show the intensity distribution of the light emerging at the end of the waveguide in the event of a change in the width of the waveguide element, the parameter of width w, which is in this case 2 µm for the characteristic curve 2910 and 3 µm for the characteristic curve 2915.

Figure 33:
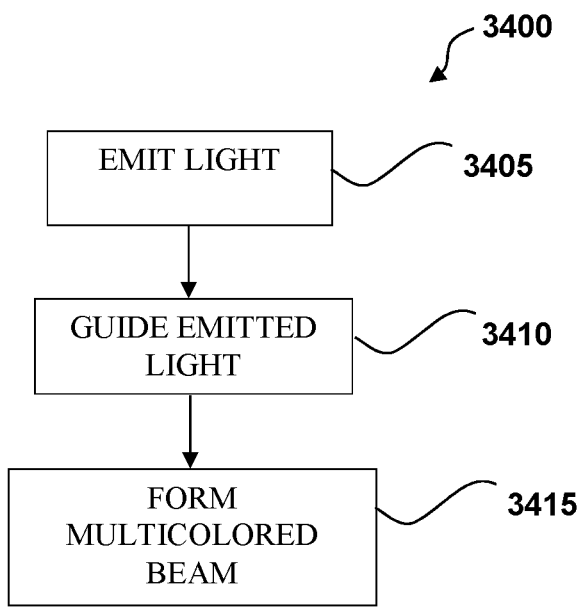
FIG. 33 shows a flowchart of a method for providing a multicolored light beam for a projector according to one exemplary embodiment.

FIG. 33 shows a flowchart of a method 3400 for providing a multicolored light beam for a projector according to one exemplary embodiment. The method 3400 may, for example, be carried out by using an exemplary embodiment of the aforementioned device. The method 3400 comprises an emission step 3405, a guiding step 3410 and a forming step 3415. In the emission step 3405, light is emitted by using a first light source and a second light source. In the guiding step 3410, light of the first light source is guided by using a first waveguide. In the guiding step 3410, light of the second light source is furthermore guided by using a second waveguide. In the guiding step 3410, light is also output from the first waveguide and the second waveguide by using an output region. The first waveguide, the second waveguide and the output region are formed from a waveguide element. In the forming step 3415, the multicolored light beam is formed by means of a beamforming device by using the light output from the output region.

Figure 34:
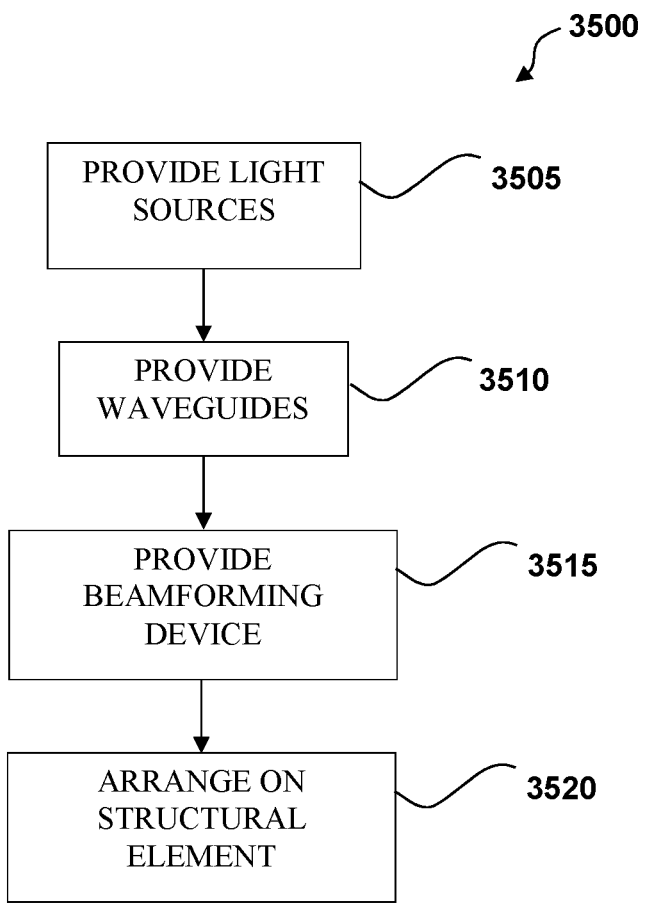
FIG. 34 shows a flowchart of a production method for producing a device for providing a multicolored light beam for a projector according to one exemplary embodiment.

FIG. 34 shows a flowchart of a production method 3500 for producing a device for providing a multicolored light beam for a projector according to one exemplary embodiment. The production method 3500 comprises a step 3505 of providing a first light source and a second light source. The production method 3500 furthermore comprises a step 3510 of providing a waveguide element which forms a first waveguide for guiding light of the first light source, a second waveguide for guiding light of the second light source and an output region for outputting light from the first waveguide and the second waveguide. The production method 3500 furthermore comprises a step 3515 of providing a beamforming device which is configured to form the multicolored light beam by using the light output from the output region. The steps 3505, 3510, 3515 may be carried out in a suitable order or in parallel with one another. The production method 3500 furthermore comprises a step 3420 of arranging the first light source, the second light source, the waveguide element and the beamforming device on a structural element, in order to produce the device. In the arrangement step 3520, said component parts are optionally fastened on the structural element by using a fastening method, for example a soldering process or by means of eutectic bonding.

If an exemplary embodiment contains an "and/or" combination between a first feature and a second feature, this is to be understood as meaning that the exemplary embodiment according to one embodiment has both the first feature and the second feature, and according to a further embodiment has only the first feature or only the second feature.

The invention claimed is:

1. A device for providing a multicolored light beam for a projector comprising:
   a first light source configured to provide a first light beam of a first color, and a second light source configured to provide a second light beam of a second color different from the first color;
   a waveguide element, which forms a first waveguide configured to guide the first light beam, a second waveguide configured to guide the second light beam, and an output region for outputting light from the first waveguide and the second waveguide;
   a beamforming device configured to form the multicolored light beam using the light output from the output region; and
   a structural element, on which the first light source, the second light source, the waveguide element and the beamforming device are arranged, wherein the first waveguide and the second waveguide are configured as single-mode waveguides, and wherein ends, formed in the output region, of the first waveguide and of the second waveguide are arranged at a different distance from the beamforming device.

2. The device as claimed in claim 1, wherein the first waveguide and/or the second waveguide is formed as a strip waveguide or as a rib waveguide or as a cylindrical waveguide.

3. The device as claimed in claim 1, wherein the waveguide element is configured as an optical chip.

4. The device as claimed in claim 1, wherein the waveguide element forms a first input element for inputting light from the first light source into the first waveguide and/or a second input element for inputting light from the second light source into the second waveguide.

5. The device as claimed in claim 1, wherein the beamforming device comprises at least one microlens and one correction plate for correcting a focal point of the beamforming device.

6. The device as claimed in claim 1, having a drive electronics element which is arranged on the structural element, wherein the drive electronics element is connected to the first light source and the second light source for transmitting signals.

7. The device as claimed in claim 1, having a third light source, wherein the waveguide element forms a third waveguide for guiding light from the third light source, and wherein the output region is additionally formed to output light from the third waveguide.

8. The device as claimed in claim 1, wherein the device is smaller than 8 cubic millimeters.

9. A projector having at least one device for providing a multicolored light beam for a projector as claimed in claim 1.

10. A method for providing a multicolored light beam for a projector comprising:
    emitting light of a first color using a first light source mounted to a structural element
    emitting light of a second color different from the first color using a second light source mounted to the structural element;
    guiding light of the first light source using a first waveguide and guiding light of the second light source using a second waveguide, wherein the first waveguide and the second waveguide are configured as single-mode waveguides, and wherein ends, formed in an output region, of the first waveguide and of the second waveguide are arranged at a different distance from a beamforming device;
    outputting light from the first waveguide and the second waveguide using the output region, the first waveguide, the second waveguide and the output region formed from a waveguide element; and
    forming the multicolored light beam with the beamforming device using the light output from the output region.

11. A production method for producing a device for providing a multicolored light beam for a projector, comprising:

providing a first light source configured to provide a first light beam of a first color, and a second light source configured to provide a second light beam of a second color different from the first color;

providing a waveguide element, which forms a first waveguide configured to guide light of the first light source, a second waveguide configured to guide light of the second light source, and an output region configured to output light from the first waveguide and the second waveguide;

providing a beamforming device, which is configured to form the multicolored light beam by using the light output from the output region; and arranging the first light source, the second light source and the beamforming device on a structural element in order to produce the device for providing a multicolored light beam for a projector, wherein the first waveguide and the second waveguide are configured as single-mode waveguides, and wherein ends, formed in the output region, of the first waveguide and of the second waveguide are arranged at a different distance from the beamforming device.

* * * * *